United States Patent
Yamamoto

(10) Patent No.: US 7,411,481 B2
(45) Date of Patent: Aug. 12, 2008

(54) ELECTRONIC CONTROL APPARATUS FOR MOTOR VEHICLE

(75) Inventor: Hirotaka Yamamoto, Okazaki (JP)

(73) Assignee: DENSO Corporation, Kariya (JP)

( * ) Notice: Subject to any disclaimer, the term of this patent is extended or adjusted under 35 U.S.C. 154(b) by 169 days.

(21) Appl. No.: 10/913,535

(22) Filed: Aug. 9, 2004

(65) Prior Publication Data

US 2005/0033503 A1 Feb. 10, 2005

(30) Foreign Application Priority Data

Aug. 8, 2003 (JP) ............................. 2003-290733
Jun. 1, 2004 (JP) ............................. 2004-163586

(51) Int. Cl.
*G06F 7/04* (2006.01)
(52) U.S. Cl. ..................................... 340/5.72; 307/10.2
(58) Field of Classification Search ................ 340/5.72, 340/5.31, 426.11; 307/10.2, 10.5; 701/114; 123/179.3
See application file for complete search history.

(56) References Cited

U.S. PATENT DOCUMENTS

| 5,819,796 | A * | 10/1998 | Kunimitsu et al. .......... 137/587 |
| 6,285,931 | B1 * | 9/2001 | Hattori et al. .................. 701/29 |
| 6,297,567 | B1 * | 10/2001 | Yano .......................... 307/10.3 |
| 6,326,705 | B1 * | 12/2001 | Yano .......................... 307/10.2 |
| 6,772,586 | B2 * | 8/2004 | Miyahara et al. .............. 60/277 |
| 2002/0144667 | A1 * | 10/2002 | Ito ........................... 123/179.3 |
| 2005/0021304 | A1 * | 1/2005 | Hirashima .................. 702/185 |

FOREIGN PATENT DOCUMENTS

JP 8-218704 8/1996

\* cited by examiner

*Primary Examiner*—Edwin C Holloway, III
(74) *Attorney, Agent, or Firm*—Nixon & Vanderhye P.C.

(57) ABSTRACT

An ECU of a vehicle is activated to communicate with a user validation apparatus while a specific signal such as an ignition signal is being produced, and to perform a first control operation when positive validation occurs, and can be activated by a request signal for a second control operation while the specific signal is off, without performing the communication. Erroneous detection of a communication error is avoided in a case when communication is interrupted due to switch-off of the specific signal and the request signal for the second control operation is received during that communication.

47 Claims, 14 Drawing Sheets

ELECTRONIC CONTROL APPARATUS FOR MOTOR VEHICLE

This application is based on and incorporates herein by reference Japanese Patent Application No. 2003-290733 filed on Aug. 8, 2003 and 2004-163586 filed on Jun. 1, 2004.

BACKGROUND OF INVENTION

1. Field of Application

The present invention relates to an electronic control apparatus utilized in a motor vehicle equipped with a user validation apparatus, with the electronic control apparatus controlling various operations of the vehicle.

In particular, the invention relates to an electronic control apparatus that enables engine starting and running when a validation result indicates that a user is permitted to drive the vehicle, and that can be activated to perform other functions such as diagnosis of the condition of the engine or other equipment while engine operation is not enabled.

2. Prior Art Technology

In the prior art, motor vehicles have been developed which are equipped with a user validation apparatus having a function of performing a check of user validity and which prevents the vehicle from being driven if a correct result is not obtained from the validity check. Such a user validation apparatus is described in Japanese Patent Laid-open No. 8-218704, for example. An IC (integrated circuit) chip is built into the ignition key of the vehicle and has an ID (identity, i.e., validity) code stored therein, and when the ignition key is inserted into the key cylinder of the vehicle, the ID code is acquired by the user validation apparatus.

The received code is compared with a corresponding code that is stored in the user validation apparatus, to thereby check whether the individual attempting to start the vehicle is a valid user. Various aspects of operation of the vehicle, including engine starting, are controlled by an engine ECU (electronic control unit), and the results of the ID check by the user validation apparatus are supplied to the engine ECU from the user validation apparatus. If the results indicate a valid user then the engine ECU begins control of the fuel injectors, ignition system, etc., of the vehicle engine, to enable engine starting.

In recent years, requirements have arisen for vehicles which are capable of performing failure diagnosis of various equipment relating to engine control, with such failure diagnosis being performed while the engine is halted, i.e., after the ignition key has been actuated to open the ignition switch. For example, it may be arranged that after a predetermined interval has elapsed following switch-off of the engine, the engine ECU is automatically activated by a command produced from an internal timer IC (SOK IC) after a predetermined time interval.

Furthermore, such a vehicle may be equipped with a capability for performing other operations to prepare the vehicle for engine starting, such as initialization processing performed by the engine ECU immediately prior to engine starting. In that case, it may be arranged that the engine ECU can be activated by a command sent from an external source, for example with an activation request being generated by a door lock sensor and transmitted to the engine ECU when a door lock of the vehicle is released. Alternatively, the engine ECU may be provided with an internal timer function whereby after a predetermined time interval has elapsed following deactivation of the ECU and halting of the engine, the ECU is automatically re-activated to perform a function such as diagnosis of vehicle equipment.

However when such a function whereby the engine ECU may be activated while the ignition is switched off is provided in a vehicle that is equipped with a user validation apparatus, then problems are found to arise. Specifically, the user validation apparatus becomes deactivated (e.g., with no electric power supplied thereto) when the ignition switch is open. When the ignition is switched on and communication between the ECU and the user validation apparatus thereby initiated, it is possible that an activation request signal may be received while that communication is in progress. In that case, if the ignition is then switched off before the communication is completed, the ECU will continue to be activated, and a condition will exist whereby the user validation apparatus has been deactivated and a communication failure or validation failure has apparently occurred. In the prior art, occurrence of this condition will result in a communication error being erroneously detected and recorded, although in fact there has been no error caused by apparatus malfunction or insertion of a non-valid ignition key. In practice, this is a serious problem with such a prior art ECU that is used in conjunction with a user validation apparatus.

SUMMARY OF THE INVENTION

It is an objective of the present invention to overcome the above problem of the prior art, by providing an electronic control apparatus for a vehicle that is equipped with a user validation apparatus, whereby activation of the electronic control apparatus is appropriately performed in accordance with the operating condition of the vehicle.

Such an electronic control apparatus is applicable to a motor vehicle equipped with a user validation apparatus, wherein the electronic control apparatus controls basic functions of the vehicle (in particular, the engine operation) and:

(a) can be activated in response to a specific key switch such as the ignition switch being closed or, (b) can be activated while the specific key switch is open, in response to an internally generated activation request (for example, produced by a device such as an internal timer circuit which is maintained in a continuously operable condition) or in response to an activation request generated from an external source.

According to one aspect of the invention, the electronic control apparatus incorporates judgement means which operate, when the electronic control apparatus becomes activated, to judge whether the activation has occurred due to the aforementioned specific key switch being closed so that the corresponding key switch signal, such as the IG (ignition) signal, is produced. If the activation is found to have occurred due to the specific key switch signal being produced, then the electronic control apparatus initiates communication with the user validation apparatus and if a correct result, i.e., positive validation result is obtained, then a control means of the electronic control apparatus begins a first predetermined control operation, such as control to enable engine starting. However if it is judged that the activation did not occur in response to the predetermined key switch signal, and so has resulted from an internally or externally derived activation signal while the predetermined key switch signal is not being produced then the control means of the electronic control apparatus begins to perform a second predetermined control operation, without communicating with the user validation apparatus.

The second predetermined control operation that is executed in that case corresponds to the source of the activation request. For example if that command has been transmitted by wireless communication from a supervisory center, to request diagnostics data that have been derived and recorded by the electronic control apparatus, then the control means of the electronic control apparatus performs operations whereby the diagnostics data are read out and transmitted to the supervisory center.

Typically, with a vehicle powered by an internal combustion engine, the specific key switch signal will be the IG (ignition) signal, produced when the ignition switch is closed by a user who intends to start the engine of the vehicle, and the electronic control apparatus will typically be an engine ECU which enables engine starting and performs subsequent engine control (with these constituting the aforementioned first predetermined control operation) if a positive user validation result is obtained.

It can thus be understood that it is a feature of the present invention that reliable discrimination is made between two basic possible causes of activation of the electronic control apparatus, i.e.:

(1) activation as a result of a specific key switch signal being produced, whereby the user validation apparatus is also activated, and (2) activation as a result of an internally or externally derived activation signal, while the aforementioned specific key switch signal is not being produced (in which case the user validation apparatus is not activated).

With the present invention, due to such a capability for reliably distinguishing between the two possible causes of activation of the electronic control apparatus, erroneous detection and recording of a communication error condition is effectively prevented.

According to another aspect, at least one flag is utilized, which is set when an internally or externally generated activation request is received by the electronic control apparatus. The term "flag" is used herein with the significance of a flag bit, i.e., a specific bit that is held in a register or memory. If the electronic control apparatus is activated while this flag is in a predetermined condition (e.g., set to a value of 1), then the judgement means will correctly judge that this activation has resulted due to an activation signal being received, and not due the aforementioned specific key switch signal being produced.

The apparatus may have a plurality of such flags, respectively corresponding to different control operations. In that case, when an activation request is received by the electronic control apparatus while the predetermined key switch is open, and an activation signal thereby produced, a flag is set which corresponds to the source of the activation request, i.e., corresponds to a specific control operation, whereupon the electronic control apparatus performs that control operation.

From another aspect, such an electronic control apparatus comprises memory means for storing, as diagnostics history data, information relating to a failure to obtain a positive validation result through communication with the user validation apparatus. The electronic control apparatus includes means for judging whether such a failure was due to the predetermined key switch having been opened while the communication to obtain a validation result was in progress, thereby deactivating the user validation apparatus and so interrupting the communication, with this interruption having occurred while an activation request was being received (so that the electronic control apparatus has remained continuously activated). When that is judged to be the case, no information relating to that communication error is stored as part of the diagnostics history data. In that way, erroneous detection and recording of communication errors is effectively prevented.

From another aspect, with such an electronic control apparatus, when the aforementioned specific key switch becomes closed after the electronic control apparatus has received an activation request and started the corresponding second predetermined control operation, that control operation is terminated, and the control means of the electronic control apparatus then initiates communication with the user validation apparatus to obtain a validation result, and begins the first predetermined control operation (e.g., to enable starting of the vehicle engine) if a positive validation result is obtained.

That is to say, after the electronic control apparatus has received an activation request while the key switch is open and has thereby been activated, it is possible that a user may then actuate the key switch to the closed condition. In such a case, the electronic control apparatus immediately begins communication with the user validation apparatus, and (if a positive validation result is obtained) begins the first predetermined control operation, e.g., operations for enabling engine starting, in the case of a vehicle having an internal combustion engine.

From another aspect, with the electronic control apparatus controlling the operation of equipment that is essential for running the vehicle engine, such as the ignition apparatus and/or fuel delivery (e.g., fuel injection) apparatus of an internal combustion engine when an activation request is received while the engine is halted with the predetermined key switch left open, and the electronic control apparatus is thereby activated, the electronic control apparatus inhibits the operation of all or part of the essential equipment, so ensuring that the vehicle engine cannot be operated. In that way, diagnostics operations relating to the engine can be performed safely and reliably, while anti-theft measures are enhanced.

According to another aspect, the vehicle is equipped with a wireless communication apparatus, for communicating with a supervisory center that is external to the vehicle and for supplying data received from the supervisory center data to the electronic control apparatus. When an activation request transmitted from the supervisory center is received by the electronic control apparatus from the communication apparatus, the activation request is recognized as originating from the supervisory center and the electronic control apparatus performs a failure diagnosis of predetermined equipment of the vehicle, as the second control operation, and supplies results of the failure diagnosis to the communication apparatus to be transmitted to the supervisory center.

In that way, when an activation request is received by the electronic control apparatus from the supervisory center while the aforementioned specific key switch is open (i.e., while the vehicle engine is halted), diagnostics information relating to the vehicle can be supplied to the supervisory center.

According to another aspect, with the vehicle having a fuel tank provided with a fuel intake aperture, and means operable for producing an "opening" signal to designate that the fuel intake aperture is to be opened, e.g., by opening a fuel cap, the opening signal is supplied to the electronic control apparatus as an externally generated activation request. The electronic control apparatus thereby performs (as the aforementioned second control operation) control of lowering the pressure within the fuel tank to a predetermined value and then opening the fuel intake aperture (e.g., opening the fuel cap).

In that way, when the predetermined key switch (e.g., ignition key or accessory key) of a vehicle powered by an internal combustion engine has been opened, so that the engine is halted, when the driver actuates a specific lever or pushbutton to designate opening of the fuel intake aperture, the electronic control apparatus is thereby activated, and then first performs control whereby the pressure in the fuel tank of the vehicle is reduced to an appropriate level (such that emission of fuel vapor to the atmosphere will not occur) before controlling opening of the fuel intake aperture.

From another aspect, with the vehicle being equipped with at least one sensor such as a door sensor for detecting opening of a door of the vehicle or a seat sensor for detecting that a person is occupying a driver seat of the vehicle, when a sensor signal from such a sensor is supplied to the electronic control apparatus as an externally generated activation request while the aforementioned key switch is open, the electronic control apparatus performs (as the aforementioned second control operation) a control operation for preparing to start the vehicle engine, such as processing for activating a catalyst of an exhaust emission control system of the vehicle, setting initial positions of the exhaust valves and intake valves of the engine, etc.

In that way, the electronic control apparatus can detect when a door of the vehicle is opened (or detect when the door become closed), or can detect when a person sits in the driver seat of the vehicle, and so can detect a condition in which it is likely that a user is about to commence driving the vehicle. The electronic control apparatus can thereby begin appropriate processing operations, prior to the engine being started.

From another aspect, with the vehicle having general-purpose in-vehicle communication means that enable communication between the electronic control apparatus and external equipment, when a request command is received by the electronic control apparatus via the in-vehicle communication means while the aforementioned specific key switch is open, the electronic control apparatus is activated to perform the corresponding control operation (as the aforementioned second control operation).

In that way, it becomes unnecessary to provide dedicated in-vehicle communication means for enabling the electronic control apparatus to receive activation requests from an external source, so that development time and manufacturing costs can be lowered.

In the case of a vehicle having an internal combustion engine, the closed status of the aforementioned key switch can for example correspond to the ignition key being within the key cylinder (so that an insertion switch provided in the key cylinder is in closed), or by the accessory (ACC) switch being closed, or by the ignition (IG) switch being closed.

DESCRIPTION OF PREFERRED EMBODIMENTS

First Embodiment

Figure 1:
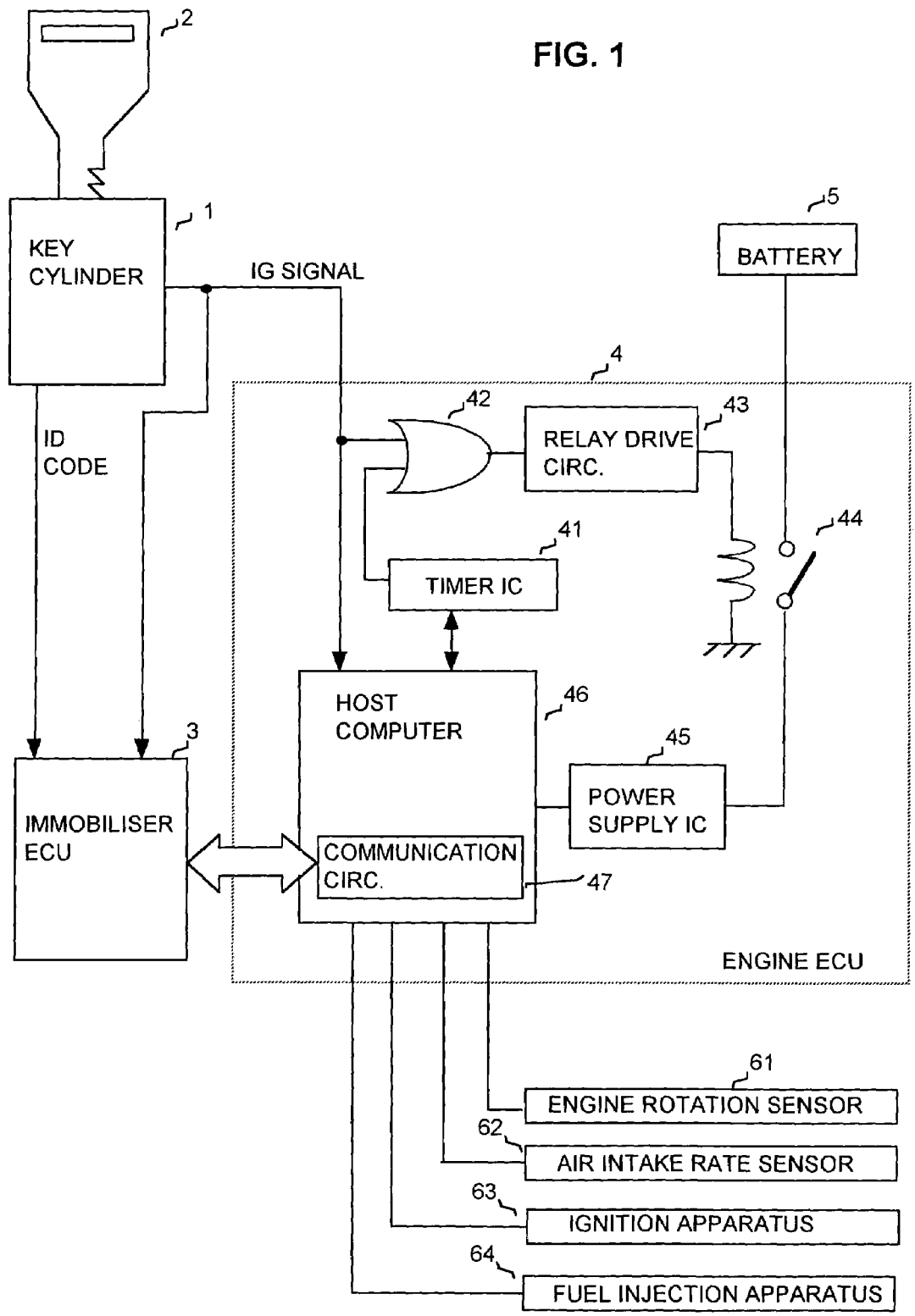
FIG. 1 is a general system block diagram of a first embodiment of an electronic control apparatus.

FIG. 1 is a general system block diagram showing a first embodiment of an electronic control apparatus, designated by numeral 4, that is mounted in a vehicle driven by an internal combustion engine (not shown in the drawings). In addition to the engine ECU 4, the system of FIG. 1 includes a key cylinder 1, an ignition key 2, an immobilizer ECU 3, and a battery 5, together with an engine rotation sensor 61, an air intake rate sensor 62, an ignition apparatus 63 and a fuel injection apparatus 64. The key cylinder 1 contains a switch circuit having four output terminals, i.e., off, accessory (ACC), ignition (IG) and starter (STA) terminals. One of these can be selected by inserting the ignition key 2 in the key cylinder 1 and setting the ignition key 2 to a corresponding position, whereby an ACC, IG or STA signal is outputted from the key cylinder 1 and supplied to various equipment of the vehicle.

It can thus be considered that the ignition key 2 is actuatable for selectively opening and closing each of an ACC switch, an IG switch and a STA switch, which respectively produce an ACC signal, IG signal and STA signal when closed. For clarity, that nomenclature will be used in the following description and in the appended claims. In addition, it will be assumed that the key cylinder 1 of this embodiment incorporates a key insertion switch that produces a key insertion signal when the ignition key 2 is inserted into the key cylinder 1.

The ignition key 2 has a built-in electronic chip having an ID (identifier) code stored therein. When the ignition key 2 is inserted into the key cylinder 1 and is actuated to close the IG switch the immobilizer ECU 3 becomes activated, e.g., by being supplied with electric power from a power supply circuit (not shown in the drawings) that is controlled based on the IG signal. That is, power is supplied to the immobilizer ECU 3 only when the IG signal is on, while otherwise, the immobilizer ECU 3 is shut down. The ID code is then read out from the IC chip of the ignition key 2 and acquired by the immobilizer ECU 3 via a communication apparatus (not shown in the drawings). The immobilizer ECU 3 then judges whether or not the acquired ID code matches a predetermined vehicle code, to thereby determine whether the ignition key 2 corresponds to that of a valid user, i.e., with a positive validation result being obtained if the codes are found to match, and a negative validation result being obtained if they do not match.

The engine ECU 4 is made up of a timer IC 41, a OR gate 42, a relay drive circuit 43, a relay 44, a power supply IC 45, a host microcomputer 46 and a communication circuit 47.

With this embodiment, the OR gate 42 is a 2-input gate. The IG signal from the key cylinder 1 is supplied to an input port of the 46 and also to one input of the OR gate 42. The output of the OR gate 42 is connected to control the relay drive circuit 43, for selectively closing and closing the relay 44, to thereby connect or disconnect the voltage of the battery 5 to/from the power supply IC 45, and so activate or deactivate the host microcomputer 46.

The timer IC 41 incorporates an internal register (not shown in the drawings) into which a value can be set which defines an elapsed time value, and an internal counter whose count value is continuously monitored and compared with the register value. When the ignition key 2 is actuated to switch off the IG signal, this is detected by the host microcomputer 46, which then (immediately before becoming deactivated) sends a command to the timer IC 41 whereby the internal counter is started, and counts up until the count value coincides with the value set in the register, i.e., until the preset elapsed time is reached. At that point the counting is halted and the timer IC 41 outputs a signal referred to herein as an activation request signal to one input of the OR gate 42. The activation request signal continues to be outputted from the timer IC 41 until a completion signal is sent to the timer IC 41 from the host microcomputer 46 as described hereinafter.

The timer IC 41 includes a flag, referred to in the following as the timer flag, which is set to the value 1 when the activation request signal is outputted to the OR gate 42, and is reset to 0 when a completion signal is received by the timer IC 41 from the host microcomputer 46. When the OR gate 42 receives the activation request signal from the timer IC 41, or the IG signal from the key cylinder 1, it outputs an activation signal as a drive signal to the relay drive circuit 43. The relay drive circuit 43 responds by closing the relay 44, to thereby supply electric power to operate the host microcomputer 46 and so activate the engine ECU 4.

While the activation signal is not being outputted from the OR gate 42, the relay 44 is held in the open state, with the supply of power to the host microcomputer 46 thereby interrupted.

With the described embodiments, the essential functions (i.e., judgement and control functions) of the engine ECU 4 are performed by the host microcomputer 46. Hence it should be understood that with respect to the specific embodiments described herein, reference made in the following to "supplying power to the engine ECU 4" or "activation of the engine ECU 4" correspond to supplying electric power to operate the host microcomputer 46.

Each of the timer IC 41, the OR gate 42 and relay drive circuit 43 is supplied with power derived from a secondary power source (i.e., a source of electric power that is not controlled by the relay 44) by the power supply IC 45, so that each of these continues to operate when the ignition key 2 has been actuated such that the IG signal is not being produced, i.e., while the vehicle engine is halted.

The power supply IC 45 can for example contain a first voltage conversion circuit which receives the output voltage of the battery 5 via the relay 44 and converts that output voltage to a suitable power supply voltage to be supplied to the host microcomputer 46, and a second voltage conversion circuit which converts the voltage of the secondary power source to a suitable supply voltage for the timer IC 41, OR gate 42 and relay drive circuit 43, and supplies this continuously. The "secondary power source" can be implemented by supplying the voltage of the battery 5 directly to the second voltage conversion circuit of the power supply IC 45.

While the IG signal is being produced, the host microcomputer 46 controls the engine operation by driving the ignition apparatus 63 and fuel injection apparatus 64 based on sensor signals including those supplied from the engine rotation sensor 61, which detects the engine speed, and from the air intake rate sensor 62 which detects the rate of air intake of the engine. While the engine is halted, the host microcomputer 46 performs diagnosis of a known type of evaporative purge system (not shown in the drawings) of the vehicle, with that operation being referred to herein as the evaporative leak check. In addition, the host microcomputer 46 includes an internal communication circuit 47, which performs communication with the immobilizer ECU 3 to receive a validation result from the immobilizer ECU 3 and supply that to the host microcomputer 46.

With this embodiment, when the host microcomputer 46 is activated, it judges the value of the timer flag. If the timer flag is reset to 0 then this indicates that the host microcomputer 46 has been activated by the IG signal, supplied to a second input of the OR gate 42, whereby an activation signal is outputted from the OR gate 42. In that case, the communication circuit 47 begins communication with the immobilizer ECU 3. If a validation result that is obtained by the immobilizer ECU 3 and communicated to the host microcomputer 46 from the communication circuit 47 is positive (i.e., indicates a valid user) then the host microcomputer 46 begins to drive (i.e., supply electric power and respective control signals to) the ignition apparatus 63 and fuel injection apparatus 64 such that engine starting will be achieved when the STA signal is produced. If the validation result is negative or if communication between the communication circuit 47 and the immobilizer ECU 3 has not been achieved, then the host microcomputer 46 does not drive the ignition apparatus 63 and fuel injection apparatus 64, and cuts off the supply of electric power to these, to inhibit operation of the engine.

If on the other hand it is found that the timer flag value is 1 after the host microcomputer 46 has been activated, the host microcomputer 46 will thereby judge that its activation has resulted from an activation request signal produced by the timer IC 41, supplied to the OR gate 42 so that an activation signal is outputted from the OR gate 42 and the relay 44 is thereby closed, as described above. In that case, the host microcomputer 46 begins the aforementioned evaporative leak check, without initiating communication with the immobilizer ECU 3 through the communication circuit 47. While the host microcomputer 46 is performing the evaporative leak check, it maintains the ignition apparatus 63 and fuel injection apparatus 64 in an inoperative condition, e.g., with no electric power supplied to operate these.

Subsequently, when the evaporative leak check has been completed, the host microcomputer 46 sends a completion command to the timer IC 41 whereby the timer flag is reset to 0, the internal counter of the timer IC 41 is reset to a count of 0 with the counter remaining halted, and the predetermined time interval value is set in the internal register of the timer IC 41. The timer IC 41 thereby ceases to produce the activation request signal, so that the engine ECU 4 then becomes deactivated.

If the IG signal starts to be inputted to the host microcomputer 46 during the evaporative leak check (i.e., if the user sets the ignition key 2 to the IG position) then the evaporative leak check is cancelled, and the communication circuit 47 initiates communication with the immobilizer ECU 3. If the communication circuit 47 then receives a positive validation result from the immobilizer ECU 3, the host microcomputer 46 restores the supply of power to the ignition apparatus 63 and fuel injection apparatus 64, outputs control signals to these to enable starting of the vehicle engine, and begins control of subsequent engine operation. On the other hand, if the communication circuit 47 receives a validation result from the immobilizer ECU 3 that is negative or if successful communication with the immobilizer ECU 3 is not achieved, then the host microcomputer 46 maintains the ignition apparatus 63 and fuel injection apparatus 64 in a condition which inhibits engine starting.

The host microcomputer 46 includes an immobilizer shut-down history flag that is set to 1 when a condition occurs due to the following sequence of events:

(1) the IG signal was switched off, so that the timer operation of the timer IC 41 was initiated, i.e., counting up towards the predetermined elapsed time value, (2) before the elapsed time was reached, the IG signal was switched on, so that the engine ECU 4 and immobilizer ECU 3 were each activated and the engine ECU 4 commenced communication via the communication circuit 47 with the immobilizer ECU 3 to obtain a user validation result, (3) while that communication was in progress the predetermined elapsed time was reached and the timer IC 41 thereby outputted an activation request signal to the OR gate 42 and set the timer flag value to 1, and (4) before the communication had been completed, the IG signal was again switched off, thereby shutting down the immobilizer ECU 3 and so interrupting the communication before a user validation result had been obtained by the engine ECU 4 (so that occurrence of a communication error is detected by the engine ECU 4). However the engine ECU 4 remained activated, as a result of the activation request signal continuing to be inputted to the OR gate 42 from the timer IC 41.

Thus, the immobilizer shut-down history flag is set to 1 when it is detected that the immobilizer ECU 3 is deactivated and the timer flag has been set to 1.

Normally if a communication error occurs (i.e., a validation result is obtained from the immobilizer ECU 3 that is negative, or there is a communication abnormality such as an open-circuit communication line, or if power to operate the immobilizer ECU 3 has been interrupted) then information relating to the communication error is registered by the host microcomputer 46 as a part of diagnostics history data that are stored in an internal memory (not shown in the drawings) of the host microcomputer 46. However, if the communication error has resulted from a communication interruption due to the special condition described above, whereby the immobilizer ECU 3 is deactivated and the immobilizer shut-down history flag value is 1, then the information expressed by the state of the immobilizer shut-down history flag is used to ensure that no corresponding information relating to a communication error will be stored in the diagnostics history data.

Figure 2:
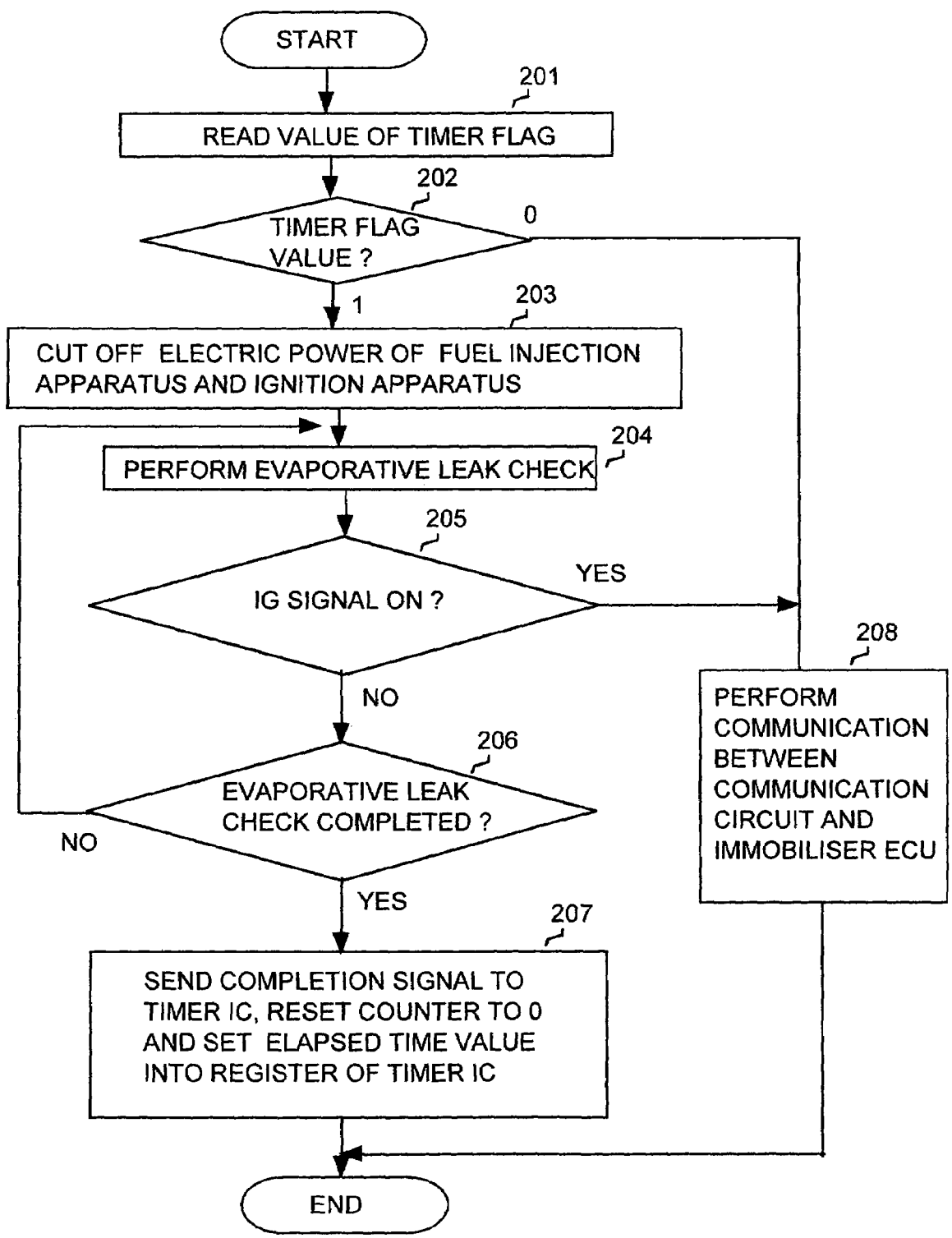
FIG. 2 is a flow diagram of processing that is executed with the first embodiment for controlling activation of an engine ECU.

FIG. 2 is a flow diagram of a control processing routine that is executed by the engine ECU 4 of this embodiment (more specifically, by the host microcomputer 46) each time the engine ECU 4 becomes activated, i.e., each time an activation signal starts to become outputted from the OR gate 42.

In FIG. 2, in step 201 the host microcomputer 46 reads out the state of the timer flag from the timer IC 41, and in step 202 the value of the timer flag is judged, i.e., a decision is made as to whether the flag value is 0 (indicating that the engine ECU 4 was activated by the IG signal being switched on) or is 1 (indicating that the engine ECU 4 was activated due to an activation request signal being produced from the timer IC 41). If it is found that the timer flag value is 1 then processing proceeds to step 203, while if the value is 0 then processing proceeds to step 208.

With this embodiment, it is assumed that the control operation which is performed by the host microcomputer 46 while the vehicle engine is halted (i.e., while the IG signal is not being produced) is an evaporative leak check. However the invention is equally applicable to the case in which the host microcomputer 46 performs one or more other control operations while the vehicle engine is halted, such as failure diagnosis of various equipment of the vehicle, or of actuators, sensors, etc.

In step 203 the supply of power to the ignition apparatus 63 and fuel injection apparatus 64 is cut off, thereby preventing erroneous operation of the vehicle engine and enhancing safety, and assisting in theft prevention. In step 204 the evaporative leak check is started In step 205 a decision is made as to whether or not IG signal is currently being produced. This judgement is made in order to determine whether the user may intend to start the vehicle engine. If the IG signal is being produced then step 208 is executed, in which the evaporative leak check is cancelled and communication between the immobilizer ECU 3 and the communication circuit 47 of the host microcomputer 46 is initiated. If the IG signal is not being produced, then step 206 is executed.

In step 206 a decision is made as to whether or not the evaporative leak check has been completed. If it is not completed, processing returns to step 204, while if it has been completed, processing proceeds to step 207.

In step 207, a completion signal is sent to the communication circuit 47, whereby the timer flag is reset to 0 and the internal counter of the timer IC 41 is reset to 0, with the predetermined time value being set into the internal register of the timer IC 41. The processing of this routine then ends. The timer IC 41 thereby ceases to output the activation request signal to the OR gate 42, so that the relay 44 becomes open and the host microcomputer 46 is thereby deactivated. The timer IC 41 thereafter maintains a condition of monitoring the count value of its internal counter, until the next time that the IG signal is switched off and this is notified to the timer IC 41 by the host microcomputer 46, so that counting up by the internal counter thereby begins again.

In step 208, after the evaporation leak check is cancelled, the communication circuit 47 begins communication with the immobilizer ECU 3, and thereafter if the validation result received from the immobilizer ECU 3 is found to be positive, control signals are applied to the ignition apparatus 63 and fuel injection apparatus 64 whereby engine starting is enabled and control of the engine operation is begun.

It should be noted that the invention is not limited to the use of the IG signal in step 205 as a basis for judging whether the user is about to begin driving the vehicle. That judgement could equally be made based upon whether a specific one of the key insertion signal and the ACC signal becomes produced, or upon whether any of the key insertion signal, ACC signal or IG signal becomes produced.

Furthermore it is not essential that the evaporation leak check be cancelled when a YES decision is reached in step 205. If that operation can be performed concurrently with engine control operations by the engine ECU 4, then the processing of steps 204 to 207 could be performed until completion, concurrent with the processing of step 208 and any subsequent engine control operations, or could be continued until after engine starting has been completed and a predetermined engine speed has been attained.

It should further be noted that since there are only two possible causes of activation of the engine ECU 4 with this embodiment (that is, the IG signal becoming produced from the key cylinder 1, or the activation request signal becoming produced from the timer IC 41), it would be possible to replace the steps 201, 202 of FIG. 2 by a step of judging whether or not the IG signal is being produced. In that case, if the IG signal is judged to be on, step 208 would be executed, while otherwise step 203 would be executed.

Alternatively, such a judgement step could be executed to determine whether or not an activation request signal is being produced by the timer IC 41. If it is being produced, then step 203 would be executed, while otherwise, step 208 would be executed.

This embodiment is described for the case in which the closed condition of the IG switch is used as an indication that a user may be about to begin driving the vehicle, so that the IG signal is used for various control and judgement operations. However it would be equally possible to utilize either the key insertion signal or the ACC signal in the same way as described for use of the IG signal. If for example the key insertion signal were used, then an activation signal would be produced from the OR gate 42, and the immobilizer ECU 3 set in operation, when the key insertion signal starts to be produced. In that case, it would be possible to replace the steps 201, 202 of FIG. 2 by a step of judging whether or not the key insertion signal is being produced, in the same way as described above for the case of using the IG signal.

The invention thus enables a clear and reliable distinction to be made between:

(a) a cause of activation of the host microcomputer 46 which indicates that a user may intend to start the vehicle engine (e.g., detected based on the fact that that the ignition key 2 is inserted into the key cylinder 1 so that the key insertion signal is produced, or that the ACC signal is produced, or that the IG signal is produced), and (b) a cause of activation of the host microcomputer 46 indicating that a predetermined control operation is to be initiated by the host microcomputer 46 while the vehicle engine is halted, such as an evaporative leak check, etc.

Figure 5:
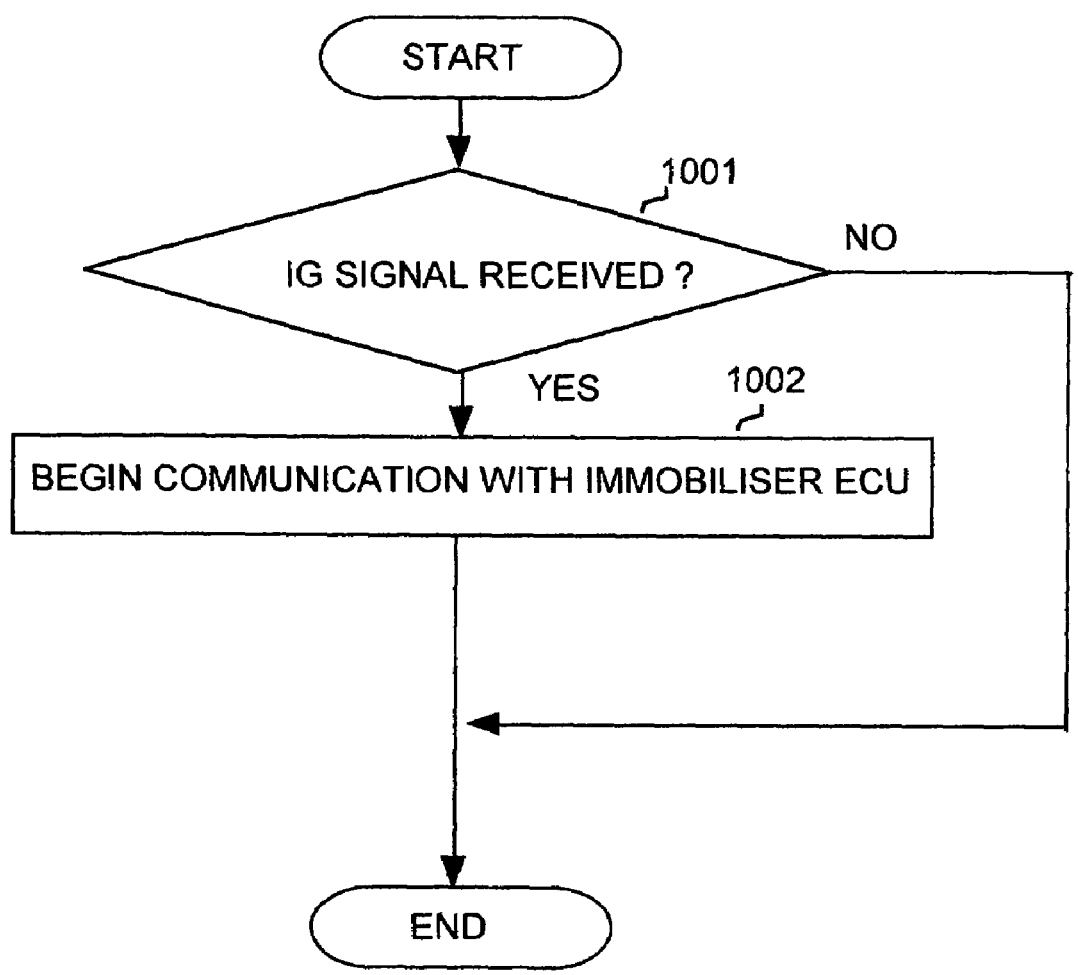
FIG. 5 is a flow diagram of processing that can be periodically executed with the first embodiment, for detecting when the ignition key has become closed while the engine ECU is performing an evaporative leak check.

While the evaporation leak check processing is in progress, it is not essential that monitoring be continuously performed to detect whether the IG signal has started to be produced (i.e., as step 205 in FIG. 2). Instead, detection of the condition of the IG signal can be performed at periodic intervals during the evaporation leak check processing, i.e., a subroutine of the form shown in FIG. 5 could be periodically executed during that processing.

Figure 3:
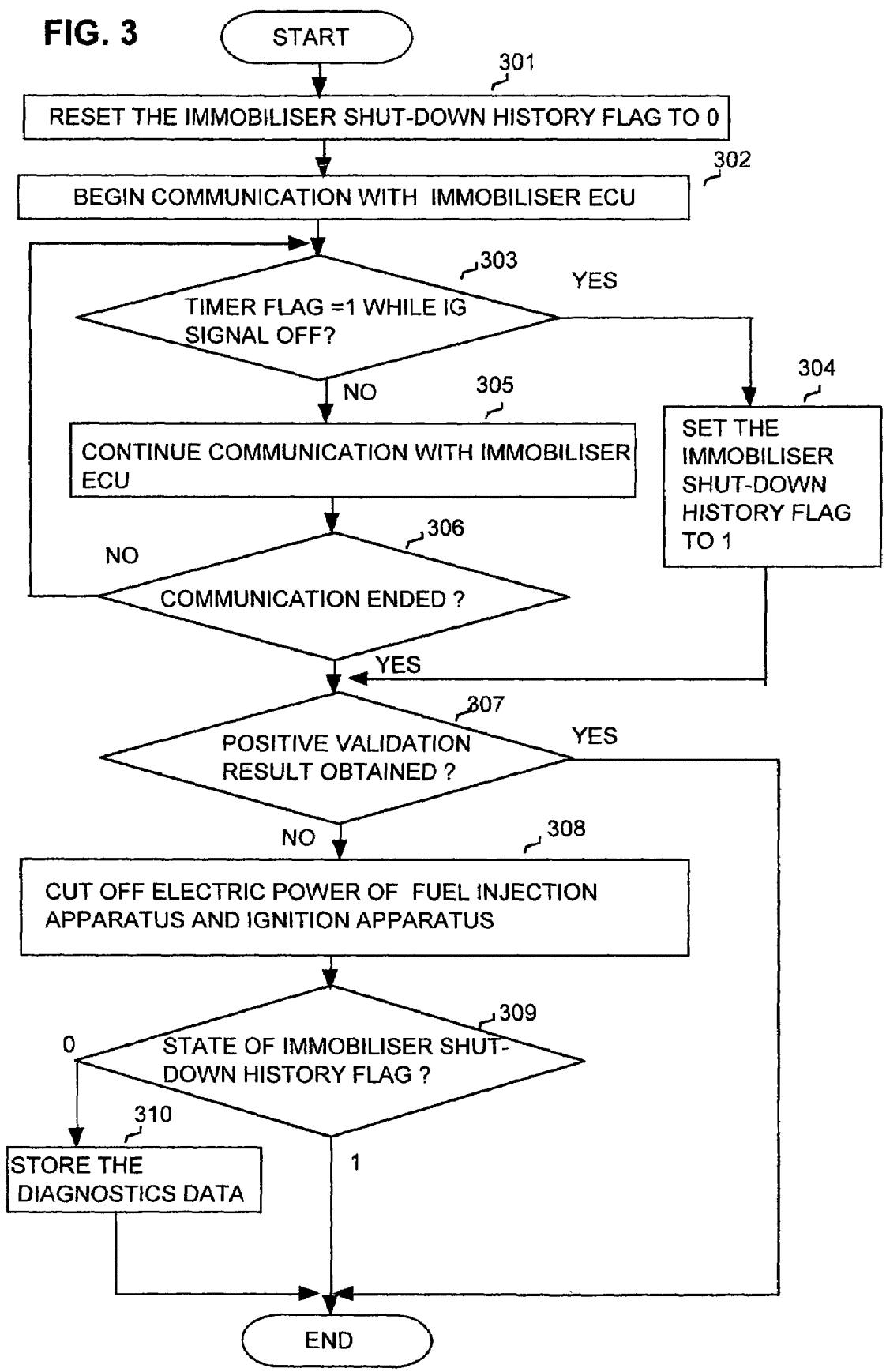
FIG. 3 is a flow diagram of processing that is executed with the first embodiment relating to communication between an engine ECU an immobilizer ECU.

FIG. 3 is a flow diagram of the processing that is executed in step 208 of FIG. 2 relating to communication between the engine ECU 4 and the immobilizer ECU 3 of this embodiment. This processing is initiated when the IG signal starts to be produced, i.e., when the engine ECU 4 becomes activated as a result of the IG signal being supplied to the OR gate 42 or when a YES decision is reached in step 205 of FIG. 2 as described above.

In step 301, the host microcomputer 46 resets the immobilizer shut-down history flag to 0, and in step 302 the communication circuit 47 begins communication with the immobilizer ECU 3. In step 303, the value of the timer flag is read out from the timer IC 41, and a decision is made as to whether the aforementioned condition exists whereby the timer flag value is 1 while the IG signal is not being produced (i.e., as a result of occurrence of the sequence of events described hereinabove whereby communication was interrupted by the IG signal becoming switched off, but an activation request signal started to be received while the communication was in progress prior to that switch-off occurrence, so that the host microcomputer 46 remains activated while the immobilizer ECU 3 is deactivated). If it is found that this condition has occurred (YES decision) then step 304 is executed, in which the immobilizer shut-down history flag is set to 1. This flag state indicates that a failure in achieving a positive user validation has occurred due to shut-down of the immobilizer ECU 3, and was not due to detection of a non-valid ignition key or due to a data communication problem. Operation then proceeds to step 307. If there is a NO decision in step 303 then step 305 is executed.

It should be noted that instead of the judgement operation of step 303 being based on the IG signal, it would be equally possible to base the judgement on a predetermined one of the key insertion signal and ACC signal.

In step 305 the communication circuit 47 performs communication with the immobilizer ECU 3 to obtain a validation result, and in step 306 a decision is made as to whether or not the communication has ended. If it is found to have ended (i.e., due to a validation result having been obtained or because the duration of the communication has exceeded a predetermined time-out limit) then a YES decision is reached, and step 307 is then executed, while if the communication has not yet ended then operation returns to step 303, and the processing from steps 303 to 306 is repeated.

In step 307 a decision is made as to whether or not the validation result that is obtained by communication with the immobilizer ECU 3 is positive. If the result is negative, or if there has been a communication failure (e.g., there was a time-out ending of the communication), then processing proceeds to step 308 in which the operation of the ignition apparatus 63 and fuel injection apparatus 64 is inhibited, for example by halting the supply of power to these. If the validation result is judged to be positive in step 307, the processing of this routine is ended.

In step 309 the value of the immobilizer shut-down history flag is judged, and if the flag has been set to 1 then this is taken to indicate that communication with the immobilizer ECU 3 was interrupted due to shut-down of the immobilizer ECU 3 as described above. In that case, since this does not indicate an actual communication error condition, information relating to this is not recorded in the diagnostics history data, and processing then ends. If the immobilizer shut-down history flag value is 0, then step 310 is executed in which information relating to the communication error is recorded in the internal memory of the host microcomputer 46 as part of the diagnostics history data. This information signifies that there was a communication failure between the communication circuit 47 and the immobilizer ECU 3 while the immobilizer ECU 3 was being supplied with electric power, or that a negative validation result was obtained.

Figure 4:
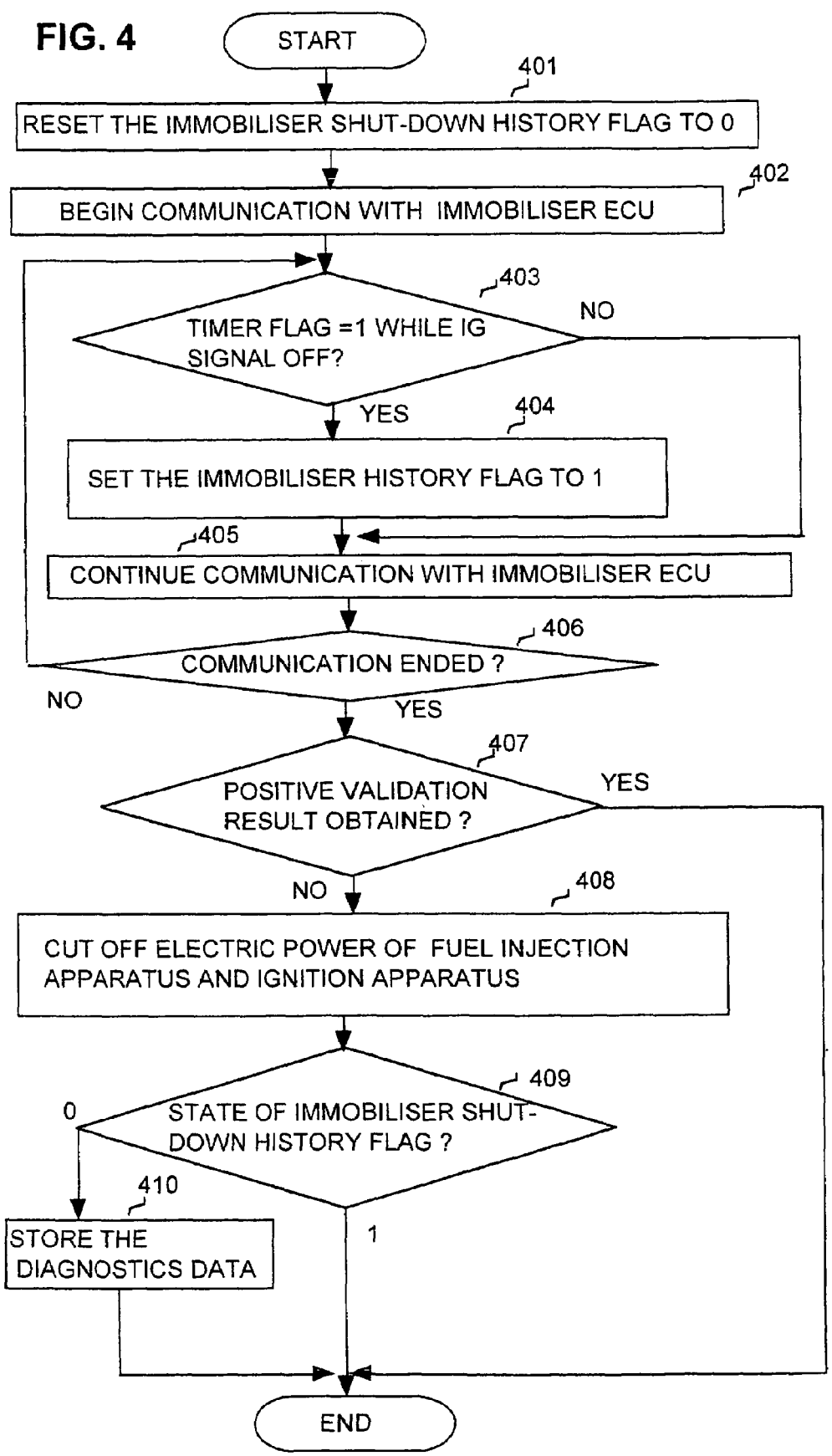
FIG. 4 is a flow diagram of an alternative form of the processing of FIG. 3.

FIG. 4 is a flow diagram of an alternative processing routine to that of FIG. 3, for a modified form of the first embodiment. Only the essential features of difference between the processing of FIG. 4 and that of FIG. 3 will be described. In FIG. 4, a judgement step 403 corresponds to the judgement step 303 of FIG. 3 described above. If it is found in step 403 that the timer flag value is 1, while the IG signal is not being produced (i.e., a YES decision) the step 404 is executed in which the immobilizer shut-down history flag is set to 1, in the same way as for step 304 of FIG. 3. If there is a NO decision in step 403, then step 404 is skipped, and step 405 then executed. Step 406 is then executed to judge whether the communication has ended, and if so, step 407 is executed, while otherwise the processing returns to step 403.

The subsequent steps 407 to 410 correspond to the steps 307 to 310 respectively in the flow diagram of FIG. 3 described above. It can be understood from the above that similar effects can be obtained to those of the processing routine of FIG. 3.

It can thus be understood that with the above embodiment, each time the engine ECU 4 is activated, it judges whether that is a result of a predetermined key switch signal such as the IG signal becoming switched on, or is due to an activation request signal being produced from the timer IC 41. If the latter is found to be the case, then the communication circuit 47 does not communicate with the immobilizer ECU 3, and the evaporative leak check is started. It can further be understood that when the vehicle is equipped with a user validation apparatus such as an immobilizer that is activated and deactivated in accordance with the predetermined key switch signal, if that user validation apparatus becomes deactivated by switch-off of the predetermined key switch signal while communication is in progress with the engine ECU 4, and the engine ECU 4 remains activated due to having received an activation request while the communication was in progress, the communication interruption will not be recorded as being a communication error.

However if there is an actual failure of communication between the host microcomputer 46 and immobilizer ECU 3 for some reason such as a communication line abnormality, or if an attempt is made to start the vehicle engine by using a non-valid ignition key, then information relating to the event will be stored in memory as part of a diagnostics history record.

With the above embodiment, the engine ECU 4 can be activated as a result of an activation request signal being produced from the timer IC 41 and inputted to the OR gate 42, following a predetermined interval after the IG signal has been switched off so that the engine is halted. The timer IC 41 then performs a diagnosis of the engine condition. However it would be equally possible to configure the apparatus such that an activation request signal is produced and inputted to the OR gate 42, to thereby activate the engine ECU 4, is transmitted to the engine ECU 4 in response to detection of an event such as opening of a door lock of the vehicle or detection of a specific condition of a seat belt (e.g., a condition indicating that an occupant is sitting in the driver seat), based on sensor signals produced from respective sensors while the engine is halted. If such an alternative method were to be used, then it would become possible to perform preparatory processing before starting the engine, such as activation processing of a catalyst, before the ignition key of the vehicle is set to the IG position. In addition it would become possible to adjust the engine intake valves and exhaust valves to optimum positions prior to engine starting, to thereby enhance the starting characteristics of the engine and reduce exhaust emissions. While that is being performed, only the engine ECU 4 would be activated, without power being supplied to operate the immobilizer ECU 3, so that communication between the engine ECU 4 and immobilizer ECU 3 (as described above) would not be performed. Thereafter, when the ignition key 2 is set to the IG position, that communication to obtain a user validation result would begin.

Furthermore with the above embodiments, the engine ECU 4 performs communication with the immobilizer ECU 3 in order to determine whether to enable engine starting in a vehicle powered by an internal combustion engine. However it would be equally possible to arrange that instead of the engine ECU 4, a hybrid ECU that controls an electric motor for driving the vehicle performs such communication with the immobilizer ECU 3. Hence, the embodiment could also be applied to a vehicle driven by an electric motor.

With the above embodiment, a decision is made as to whether the engine ECU 4 has been activated by the IG signal or by an activation signal that has been produced from the timer IC 41. If it is judged that the engine ECU 4 has been activated by the timer IC 41, then the evaporative leak check processing is started, with no communication being performed between the engine ECU 4 and the immobilizer ECU 3.

Furthermore, if a condition occurs whereby communication between the engine ECU 4 and the immobilizer ECU 3 has been interrupted as a result of the user switching off the IG signal while the communication was in progress, and whereby an activation request signal was produced while the communication was in progress (so that the engine ECU 4 remained activated), it is ensured with the above embodiment that when there is a failure to obtain a positive validation result due to such a communication interruption, that failure will not be incorrectly recorded as a communication error, i.e., related error information will not be stored as part of the diagnostics history data. Hence, processing such as control of an evaporative leak check operation can be performed by the engine ECU 4 without problems while the vehicle engine is halted.

Essentially, such an electronic control apparatus can reliably discriminate between:

(1) a condition in which the engine electronic control unit has been activated as a result of a user action, i.e., actuating the ignition key to a predetermined condition which may indicate an intention to start the vehicle engine, and (2) a condition in which the engine ECU 4 has been activated (to perform control of a processing operation such as the evaporative leak check) while the vehicle engine is halted and the ignition key has not been actuated to the aforementioned predetermined condition.

Due to the accuracy that is achieved in distinguishing between these two different causes of activation, it can be ensured that erroneous detection of communication errors can be eliminated and more reliable operation achieved.

Second Embodiment

A second embodiment of an electronic control apparatus will be described, whereby in addition to the functions of the first embodiment, a signal transmitted from a supervisory center external to the vehicle can be received as an activation request signal, while the vehicle engine is halted, and whereby the electronic control apparatus is activated as a result of receiving such a request signal, with recorded diagnostics history data being then transmitted to the supervisory center. The remaining features of this embodiment are essentially identical to those of the first embodiment, so that detailed description will be omitted.

Figure 6:
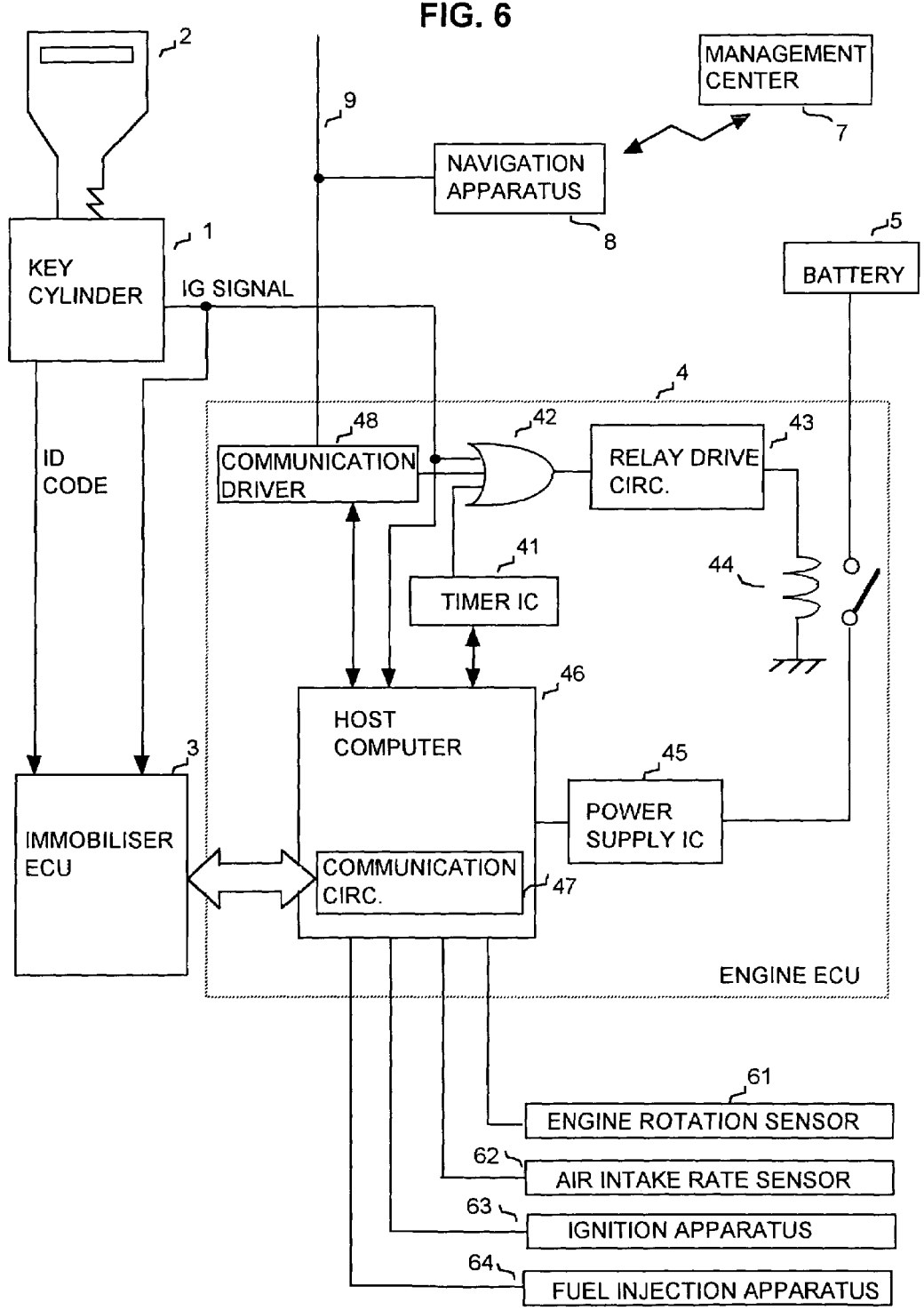
FIG. 6 is a general system block diagram of a second embodiment of an electronic control apparatus.

FIG. 6 is a block diagram showing the overall configuration of this embodiment. In FIG. 6, numeral 7 denotes a supervisory center, which transmits request signals at periodic intervals to vehicles which are within a city or town, for requesting the vehicles to transmit diagnostics history data to the vehicle supervisory center 7. In addition to information relating to communication errors as described hereinabove, the diagnostics history data may include information relating to failure diagnosis of various equipment of the vehicle. When the vehicle supervisory center 7 receives diagnostics history data transmitted from a vehicle, then if the data corresponds to specific predetermined conditions (for example, a failure has been detected 10 times in 1000 consecutive engine starting operations) a warning signal is transmitted to that vehicle from the vehicle supervisory center 7.

With this embodiment, the vehicle is also assumed to be equipped with a navigation apparatus 8 and a vehicle LAN (local area network) 9, which performs general-purpose data communication between equipment of the vehicle. The navigation apparatus 8 includes a display apparatus (not shown in the drawings), for displaying a map of the area around the vehicle, indicating the current position of the vehicle within that area, and the direction in which the vehicle is moving.

The navigation apparatus 8 may also determine the optimum route to a target destination, and notify the user of that route. The navigation apparatus 8 is connected to a wireless communication apparatus (not shown in the drawings) and is also connected to the vehicle LAN 9. When the navigation apparatus 8 receives a request signal that has been transmitted from the vehicle supervisory center 7, the navigation apparatus 8 transfers the request signal to the engine ECU 4 via the vehicle LAN 9, as an activation request signal. The engine ECU 4 responds by reading out the diagnostics history data and supplying these via the vehicle LAN 9 to the navigation apparatus 8, which then transmits the data to the vehicle supervisory center 7. When a warning signal is transmitted from the vehicle supervisory center 7 and received by the navigation apparatus 8, the navigation apparatus 8 generates a display of a warning image on the display apparatus, to thereby notify the driver that there is a problem with the vehicle, or that the vehicle should be taken to an automobile dealer or service center, etc.

It should be noted that the invention is not limited to the use of the navigation apparatus 8 for transmitting diagnostics history data, and it would be equally possible to use a wireless communication apparatus other than that of the navigation apparatus 8, connected to the vehicle LAN 9, for transmitting the diagnostics history data and receiving request signals etc.

The engine ECU 4 of this embodiment includes a communication driver 48, which is connected between the host microcomputer 46 and the vehicle LAN 9 and is also connected to the OR gate 42. If the communication driver 48 receives a request signal from the navigation apparatus 8 via the vehicle LAN 9 while the vehicle engine is halted, it outputs an activation request signal to the OR gate 42 to thereby activate the host microcomputer 46, and maintains this activation signal until receiving a completion signal from the host microcomputer 46. By using the vehicle LAN 9 in this way, it becomes unnecessary to provide a dedicated communication line for the engine ECU 4 to receive request signals.

The communication driver 48 includes a remote diagnosis activation flag (not shown in the drawings). When the communication driver 48 receives a request signal, transferred from the navigation apparatus 8 via the vehicle LAN 9, and thereby outputs an activation request signal to the OR gate 42, the remote diagnosis activation flag is set to 1. When a completion signal is subsequently received by the communication driver 48 from the host microcomputer 46, the remote diagnosis activation flag is thereby reset to 0 and the activation request signal is terminated.

The OR gate 42 of this embodiment is a 3-input gate, and in addition to the functions described above for the first embodiment, it outputs an activation signal for activating the host microcomputer 46 when supplied with the activation request signal produced from the communication driver 48.

The navigation apparatus 8 and the communication driver 48 are continuously supplied with power from the power supply IC 45 in the same way as described hereinabove for the timer IC 41, the OR gate 42 and the relay drive circuit 43, i.e., irrespective of whether the relay 44 is open or closed.

In addition to the functions described above for the first embodiment the host microcomputer 46 of this embodiment also performs failure diagnosis of various equipment (not shown in the drawings) of the vehicle at periodic intervals, with this being performed for example each time that the engine has been started 50 times in succession. The host microcomputer 46 records the results obtained as diagnostics history data in an internal memory (not shown in the drawings).

When the host microcomputer 46 is activated, it examines the value of the remote diagnosis activation flag of the communication driver 48, and if that flag is found to be set to 1 then the host microcomputer 46 judges that the activation has been implemented by an activation request signal produced from the communication driver 48. In that case, the host microcomputer 46 inhibits communication between the communication circuit 47 and the immobilizer ECU 3, and also inhibits the supplying of electric power to the ignition apparatus 63 and the fuel injection apparatus 64. The host microcomputer 46 then reads out diagnostics history data which have been stored in its internal memory and supplies the data to the communication driver 48, to be transferred via the vehicle LAN 9 to the navigation apparatus 8. When all of the diagnostics history data have been transferred, the host microcomputer 46 sends a completion signal to the communication driver 48.

On the other hand if the remote diagnosis activation flag is found to be reset to 0 when the host microcomputer 46 becomes activated, then the host microcomputer 46 operates in the same manner as described for the first embodiment. That is to say, the value of the timer flag is examined, and if the value is found to be 1, then the host microcomputer 46 begins the evaporative leak check, while if the timer flag value is 0 (signifying that the host microcomputer 46 was activated due to the IG signal becoming switched on) then the communication circuit 47 begins communication with the immobilizer ECU 3. If a positive validation results is thereby obtained, the host microcomputer 46 begins to drive the ignition apparatus 63 and fuel injection apparatus 64 to enable engine starting, and begins control of the engine operation, as described for the first embodiment.

If the IG signal becomes switched on while the communication driver 48 is transferring the diagnostics history data to the navigation apparatus 8, then the communication circuit 47 of the host microcomputer 46 ceases the transferring of the diagnostics history data and begins communication with the immobilizer ECU 3, to acquire a validation result. If the obtained result is positive, then the host microcomputer 46 begins to drive the ignition apparatus 63 and fuel injection apparatus 64 to enable engine starting. However if the validation result is negative, or the communication circuit 47 is unable to communicate with the immobilizer ECU 3, then the host microcomputer 46 does not begin to drive the ignition apparatus 63 or fuel injection apparatus 64.

In addition to the combination of four conditions described above for the first embodiment, whereby the immobilizer shut-down history flag will be set to 1, the host microcomputer 46 of this embodiment will also set the immobilizer shut-down history flag to 1 if the following sequence of events has occurred:

(1) the engine ECU 4 has been activated as a result of the IG signal becoming switched on, (2) communication between the communication circuit 47 and the immobilizer ECU 3 thereby began, (3) while that communication was in progress, the communication driver 48 received a request signal from the navigation apparatus 8 via the vehicle LAN 9 and has thereby outputted an activation request signal and set the remote diagnosis activation flag to 1, (4) the IG signal was then switched off before the communication between the communication circuit 47 and the immobilizer ECU 3 had been completed, thereby deactivating the immobilizer ECU 3 and interrupting the communication. However the engine ECU 4 remained activated as a result of the activation request signal being outputted from the communication driver 48.

Hence with this embodiment, in addition to the condition described for the first embodiment whereby the immobilizer shut-down history flag is set to 1, with this embodiment the immobilizer shut-down history flag is also set to 1 if a condition has occurred whereby the IG signal is not being produced but the remote diagnosis activation flag value is 1.

This embodiment is described assuming that when a request signal is received from the vehicle supervisory center 7, the engine ECU 4 reads out the stored diagnostics history data, and the data are transmitted from the navigation apparatus 8 to the vehicle supervisory center 7. However the invention is not limited to such an arrangement, and it would be possible to transmit other information to the vehicle supervisory center 7 in that way.

In other respects, the configuration and operation of this embodiment are identical to those of the first embodiment, so that detailed description will be omitted.

Figure 7:
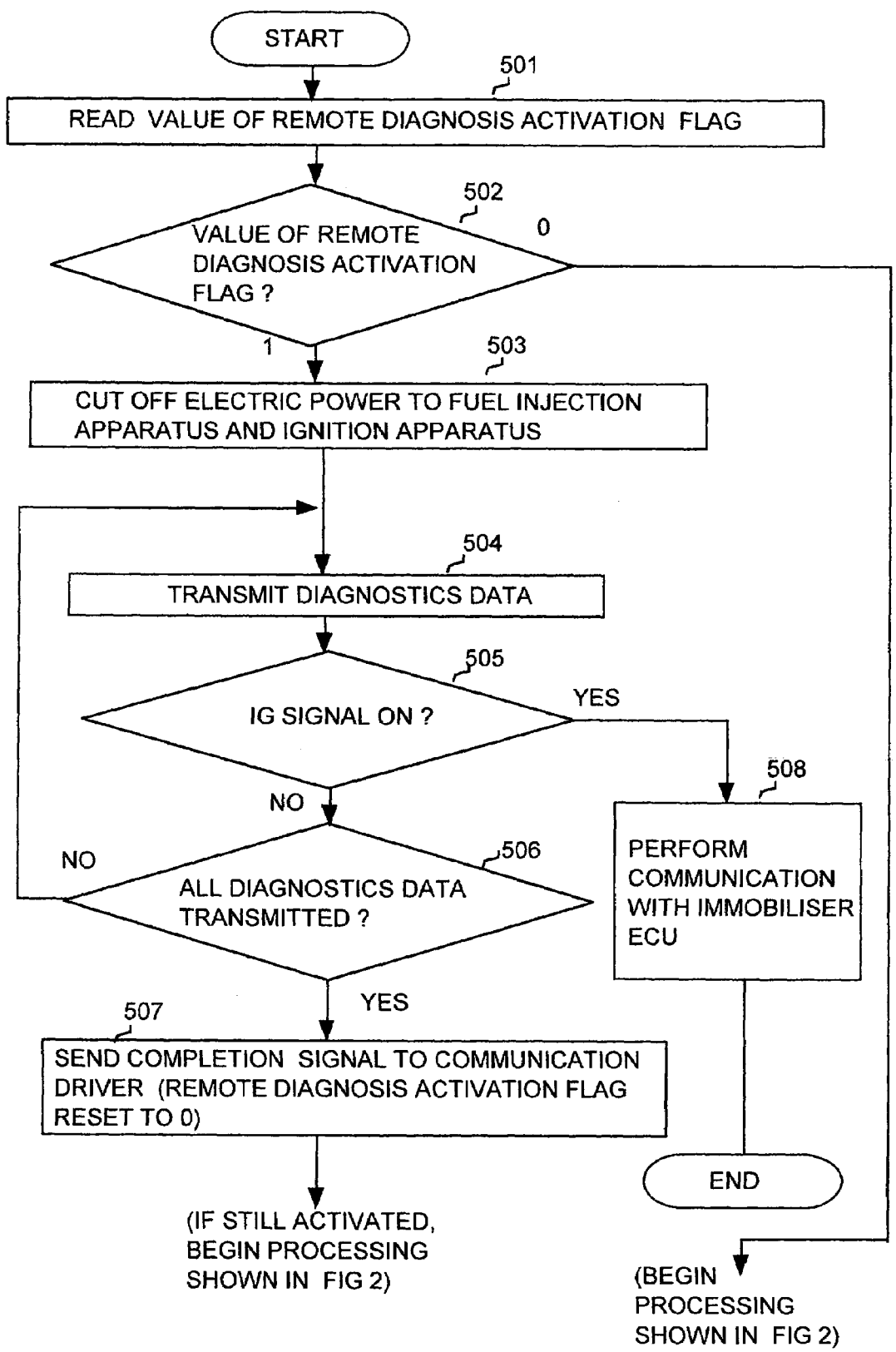
FIG. 7 is a flow diagram of processing that is executed with the second embodiment for controlling activation of an engine ECU.

FIG. 7 is a flow diagram of the processing for controlling activation of the engine ECU 4 in response to a request signal from the vehicle supervisory center 7, with this embodiment. This flow diagram differs from that of FIG. 2 for the first embodiment in that in place of the step of reading out the value of the timer flag from the timer IC 41, there is a step of reading out the value of the remote diagnosis activation flag from the communication driver 48, and in place of the step of judging the value of the timer flag, there is a step of judging the value of the remote diagnosis activation flag. Furthermore, in place of the step of judging whether or not the evaporative leak check has been completed, there is a step of judging whether or not all of the diagnostics history data have been transmitted. In addition, in place of the steps of supplying a completion signal to the timer IC 41 with the internal timer of the timer IC 41 being thereby reset to 0, and setting a predetermined count value in a register of the timer IC 41 to define a predetermined elapsed time value, there is a step of outputting a completion signal to the communication driver 48.

The processing routine shown in FIG. 7 is started each time the engine ECU 4 (i.e., the host microcomputer 46) is activated.

In step 501 of FIG. 7, the host microcomputer 46 reads the value of the remote diagnosis activation flag from the communication driver 48, and in step 502 the value of the flag is judged, to thereby reliably determine whether or not the host microcomputer 46 has been activated in response to a an activation request signal produced from the communication driver 48. If the remote diagnosis activation flag is found to be set to 1, then processing proceeds to step 503, while if the flag value is 0 then the processing of this routine is ended, and the processing routine shown in the flow diagram of FIG. 2, described hereinabove with respect to the first embodiment, is started.

In step 504, the diagnostics history data stored in the internal memory of the host microcomputer 46 are outputted to the communication driver 48, to be transferred via the vehicle LAN 9 to the navigation apparatus 8. Step 505 is then executed in which a decision is made as to whether the IG signal has started to be produced. If so, the transfer of diagnostics history data is halted and communication with the immobilizer ECU 3 is started in step 508. Otherwise, step 506 is executed, in which 506 a decision is made as to whether all of the diagnostics history data have been transferred to the navigation apparatus 8. If all of the diagnostics history data have not yet been transferred then processing returns to step 504, while if the transfer of data has been completed, processing proceeds to step 507.

In step 507, a completion signal is outputted to the communication driver 48, which resets the remote diagnosis activation flag to 0 and terminates the outputting of an activation signal to the OR gate 42. The processing of this routine is then ended, and if the microcomputer 46 is still activated, the processing routine shown in the flow diagram of FIG. 2 is started.

In the same way as described for the preceding embodiment, it would be possible to base the activation and judgement operations of FIG. 7 of the second embodiment upon a specific key switch signal other than the IG signal becoming produced, e.g., the key insertion signal or ACC signal.

Figure 8:
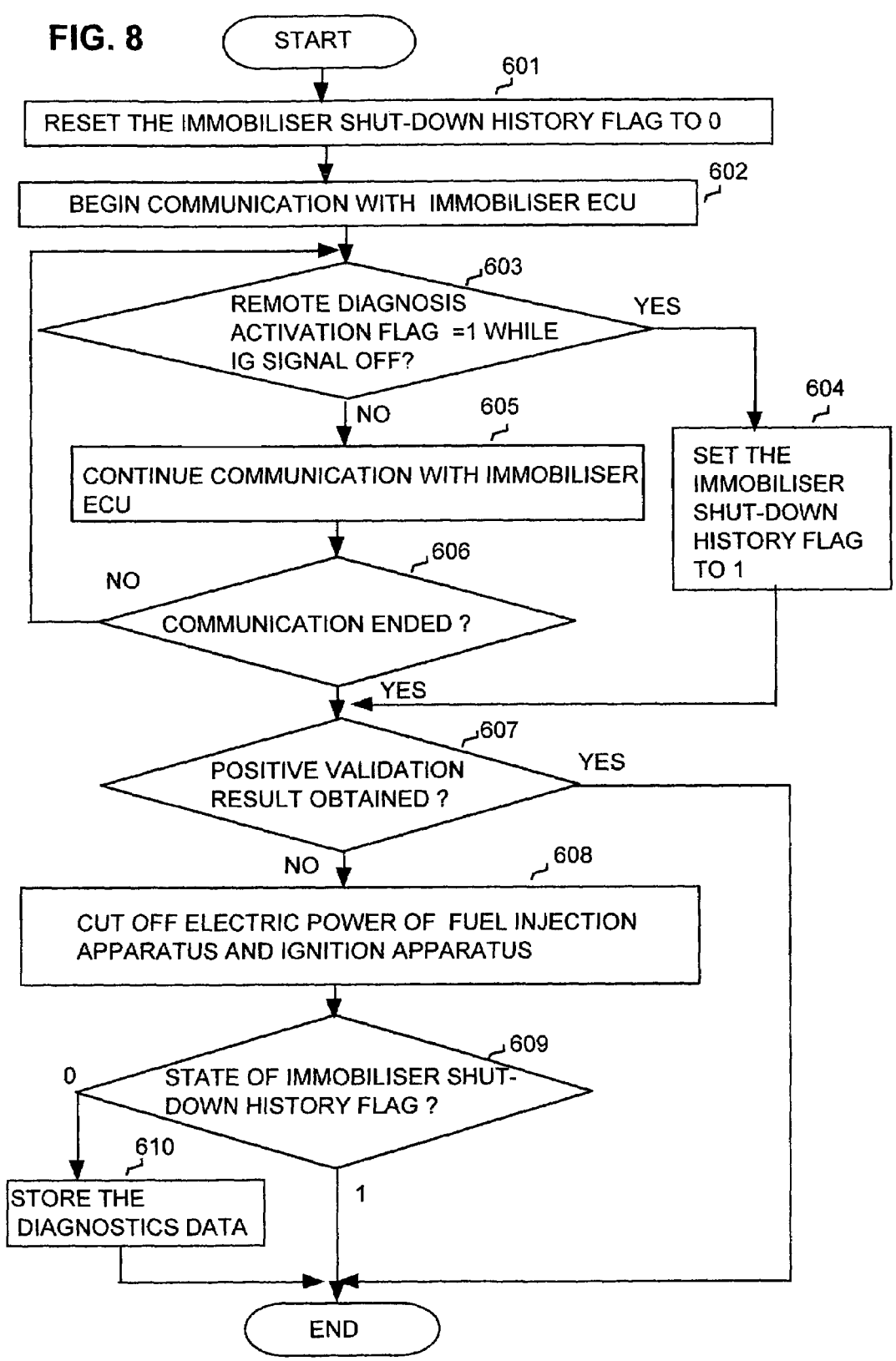
FIG. 8 is a flow diagram of processing that is executed with the second embodiment relating to communication between the engine ECU and an immobilizer ECU.

FIG. 8 shows the contents of the processing step 508 of FIG. 7, relating to communication between the engine ECU 4 and the immobilizer ECU 3 with this embodiment. In this case, the immobilizer shut-down history flag becomes set to 1 (in step 604, when there is a YES decision in step 603) if the condition described above has occurred whereby the remote diagnosis activation flag value is 1 while at the same time the IG signal is not being produced (so that the immobilizer ECU 3 has been deactivated).

Other than for the judgement step 603, the processing of FIG. 8 is identical to that of the flow diagram of FIG. 3, so that detailed description is omitted.

It can thus be understood that with this embodiment, when the host microcomputer 46 becomes activated, it determines whether this has been caused by an activation signal produced from the communication driver 48. If that is found to be the case, the host microcomputer 46 supplies the diagnostics history data from its internal memory to the communication driver 48, to be transmitted via the vehicle LAN 9 to the navigation apparatus 8, and does not initiate communication with the immobilizer ECU 3. Hence with this embodiment, even if a request signal is received from a supervisory center external to the vehicle while the vehicle engine is halted, diagnostics history data will be reliably transmitted to the supervisory center from the vehicle.

With the above embodiment, there are three possible causes of activation of the engine ECU 4, i.e., switch-on of the IG signal, an activation request signal being produced from the timer IC 41 after the predetermined time interval has elapsed following ignition signal switch-off, or reception of a request signal from the vehicle supervisory center 7. It is assumed in the above that, to determine which of these was the actual cause of activation, the value of the remote diagnosis activation flag is first examined, and if that has not been set then the value of the timer flag is examined. However the invention is not limited to such a sequence, and the possible causes of activation could be successively examined in any other sequence.

As can be understood from FIG. 8, by executing the steps 603 and 609 of FIG. 8, it can be ensured with this embodiment that if communication between the ignition key 2 and immobilizer ECU 3 is interrupted by the user switching off the IG signal, and thereby deactivating the immobilizer ECU 3, while an activation request signal has been produced due to a request transmitted from the supervisory center 7 as the communication was in progress, such a communication interruption will not be erroneously recorded as a communication error in the diagnostics history data.

Third Embodiment

A third embodiment will be described whereby, in addition to the functions of the first embodiment described above, when a fuel cap actuation lever is actuated to open the fuel intake aperture of the vehicle (e.g., by changing the fuel cap from a closed to an opened condition) while the vehicle engine is halted, the engine ECU 4 is activated, and applies control whereby the fuel vapor pressure within the fuel tank is reduced, and whereby the fuel intake aperture is opened only after the pressure has fallen to a predetermined value.

Figure 9:
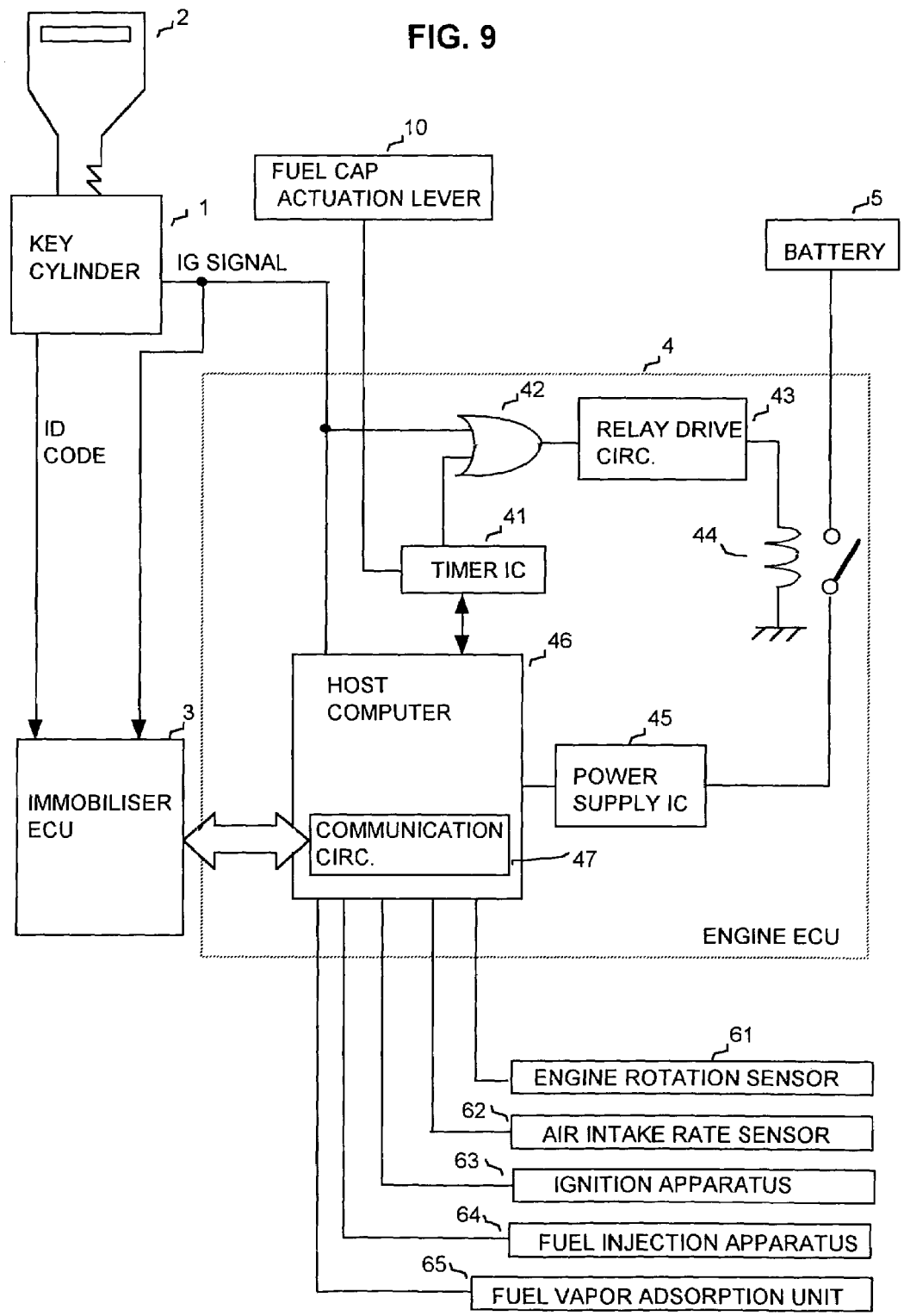
FIG. 9 is a general system block diagram of a third embodiment of an electronic control apparatus.

FIG. 9 is a block diagram of the overall configuration of this embodiment. A fuel cap actuation lever 10 is mounted at the driver seat of the vehicle, where the term "fuel cap actuating lever" is used herein to signify an apparatus including an operating member such as a lever or push-button which can be actuated by a user to produce a signal, referred to herein as the opening signal, as a request signal for effecting opening of the fuel intake aperture of the vehicle.

The fuel cap actuation lever 10 is continuously supplied with electric power via the power supply IC 45 in the same manner as described hereinabove for the timer IC 41, the OR gate 42 and the relay drive circuit 43 of the first embodiment, and so continues to operate while the IG signal is not being produced.

The opening signal from the fuel cap actuation lever 10 is inputted to the timer IC 41. In addition to the functions described above for the first embodiment, the timer IC 41 of this embodiment also has a function of supplying an activation request signal to the OR gate 42 when the opening signal is supplied from the fuel cap actuation lever 10. That activation request signal is continued until the timer IC 41 receives a completion signal from the host microcomputer 46.

The timer IC 41 of this embodiment moreover includes an internal flag referred to as the fuel cap activation flag, which is set to 1 when the timer IC 41 receives the opening signal from the fuel cap actuation lever 10 and outputs an activation request signal to the OR gate 42 in response to the opening signal. When the timer IC 41 receives a completion signal from the host microcomputer 46, it resets the fuel cap activation flag to 0.

The fuel vapor adsorption unit 65 is connected to the fuel tank of the vehicle, and includes a fan for impelling fuel vapor within the fuel tank towards a cannister, in which the fuel vapor is adsorbed, to thereby lower the pressure within the fuel tank. A pipe is provided which connects this cannister to the air intake of the engine, such that fuel that has been adsorbed within the cannister is mixed with the intake air of the engine.

In addition to the functions described above for the first embodiment, the host microcomputer 46 of this embodiment also has a function of controlling opening of the fuel intake aperture, and also of controlling adsorption of the fuel vapor from the fuel tank by the fuel vapor adsorption unit 65.

Specifically, when the host microcomputer 46 is activated, the timer IC 41 refers to the value of the fuel cap activation flag. If the flag is set to 1, then it is judged that the host microcomputer 46 has been activated as a result of the opening signal produced from the fuel cap actuation lever 10. In that case, the host microcomputer 46 inhibits communication between the communication circuit 47 and the immobilizer ECU 3, and also cuts off electric power to the ignition apparatus 63 and the fuel injection apparatus 64. The host microcomputer 46 then initiates operation of the fuel vapor adsorption unit 65, to adsorb the fuel vapor from within the fuel tank. The fuel tank is equipped with a pressure sensor (not shown in the drawings) for detecting the pressure within the fuel tank, with data expressing the detected pressure being supplied to the host microcomputer 46. When it is detected that the pressure has fallen to a predetermined value, the host microcomputer 46 terminates the operation of the fuel vapor adsorption unit 65, performs control whereby the fuel intake aperture of the vehicle is opened (i.e., the fuel cap is opened), then sends a completion signal to the timer IC 41.

On the other hand, if it is found that the fuel cap activation flag is reset to 0, then the host microcomputer 46 performs the same operations as described for the first embodiment. That is to say, if at that time the timer flag value is 1, then the evaporative leak check is started, while if the timer flag value is 0 then communication is performed between the communication circuit 47 and the immobilizer ECU 3, and if a positive validation result is obtained from the immobilizer ECU 3, the host microcomputer 46 begins to drive the ignition apparatus 63 and fuel injection apparatus 64 to enable engine starting.

If the IG signal starts to be outputted from the key cylinder 1 while the fuel vapor adsorption unit 65 is performing the adsorption operation, the host microcomputer 46 terminates the adsorption operation, and ends control of opening of the fuel intake aperture. The host microcomputer 46 then initiates communication between the communication circuit 47 and the immobilizer ECU 3 to obtain a validation result. If a validation result is obtained which is positive, then the host microcomputer 46 begins to drive the ignition apparatus 63 and fuel injection apparatus 64 to enable engine starting. If the validation result is negative, or if communication between the communication circuit 47 and the immobilizer ECU 3 is not achieved, then driving of the ignition apparatus 63 and fuel injection apparatus 64 is not initiated.

Furthermore, in addition to the combination of conditions described above for the first embodiment, whereby the immobilizer shut-down history flag will be set to 1, the host microcomputer 46 of this embodiment will also set the immobilizer shut-down history flag to 1 when the following sequence of events has occurred, leaving the timer flag set to 1 while the IG signal is not being produced:

(a) the engine ECU 4 was activated by the IG signal being switched on, (b) communication between the communication circuit 47 and the immobilizer ECU 3 was thereby begun, (c) while communication between the communication circuit 47 and the immobilizer ECU 3 was in progress, the timer IC 41 received the opening signal from the fuel cap actuation lever 10, and thereby outputted an activation request signal and set the fuel cap activation flag to 1, and (d) the IG signal was switched off before the communication between the communication circuit 47 and the immobilizer ECU 3 was completed, thereby deactivating the immobilizer ECU 3 and so interrupting the communication.

Hence, in addition to the combination of conditions described for the first embodiment whereby the immobilizer shut-down history flag will be set to 1, with this embodiment the immobilizer shut-down history flag will also be set to 1 if it is detected that the fuel cap activation flag value is 1 while at the same time the IG signal is not being produced (so that the immobilizer ECU 3 must be in the deactivated condition).

In other respects, the configuration and operation of this embodiment are identical to those of the first embodiment, so that detailed description is omitted.

Figure 10:
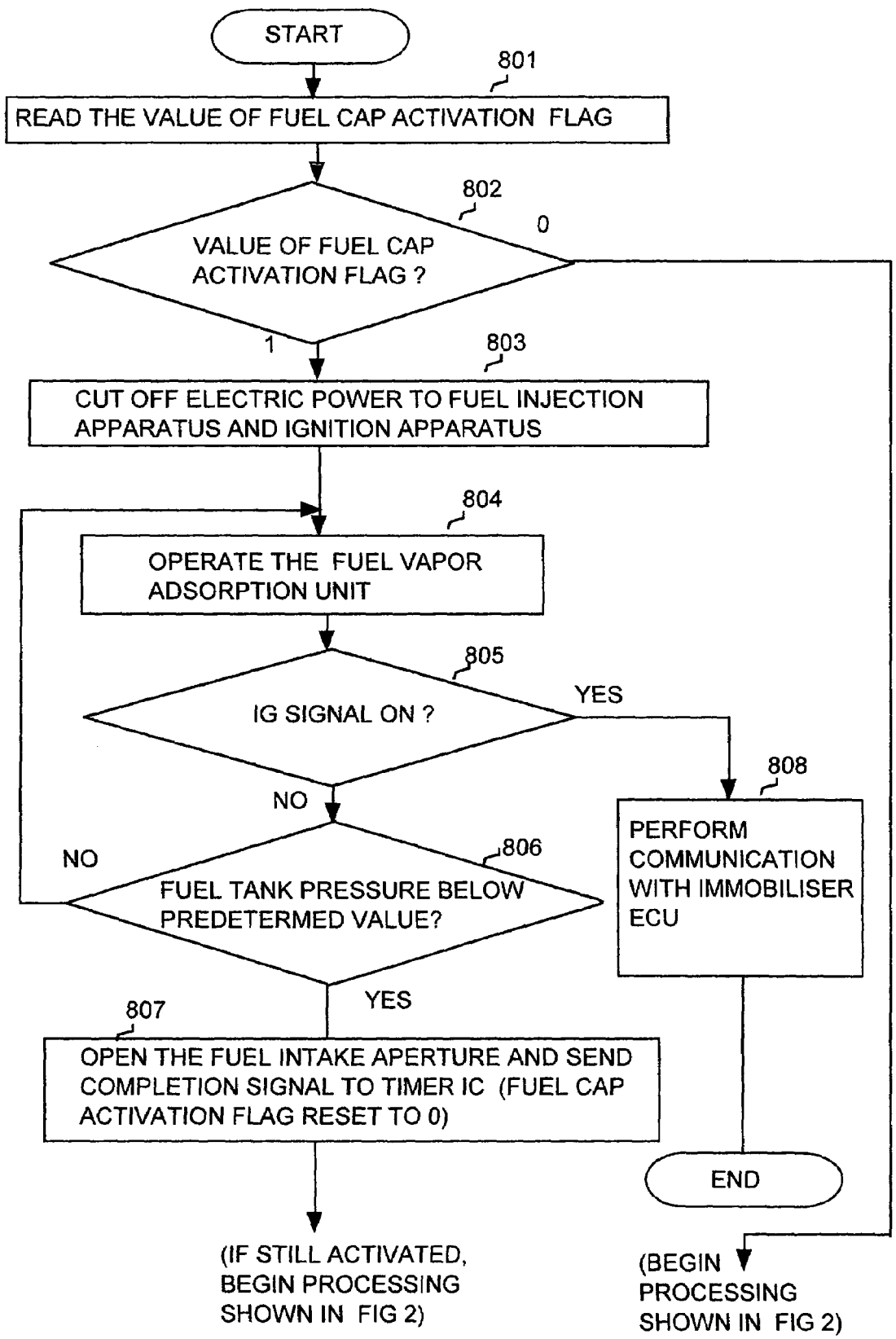
FIG. 10 is a flow diagram of processing that is executed with the third embodiment for controlling activation of an engine ECU.

FIG. 10 is a flow diagram of the processing for controlling activation of the host microcomputer 46 of the engine ECU 4 with this embodiment. This flow diagram differs from that of FIG. 2 for the first embodiment in that in place of the step of reading out the value of the timer flag from the timer IC 41, there is a step of reading out the value of the fuel cap activation flag from the communication driver 48.

In addition, in place of the step of judging the value of the timer flag, there is a step of judging the value of the fuel cap activation flag. Furthermore, in place of the step of performing the evaporative leak check, there is a step of operating the fuel vapor adsorption unit 65 for adsorbing fuel vapor that is present in the fuel tank, and in place of the step of judging whether or not the evaporative leak check has been completed, there is a step of judging whether or not the pressure within the fuel tank is below a predetermined value. Furthermore, in place of the step of supplying a completion signal to the timer IC 41, resetting the internal counter of the timer IC 41 to zero, and setting the value held in the internal register to the predetermined elapsed time value, there is a step of controlling opening of the fuel intake aperture and then outputting a completion signal to the timer IC 41.

The steps 803, 805 and 808 are respectively identical to the corresponding steps in the flow diagram of FIG. 2, so that detailed description will be omitted.

The processing routine shown in FIG. 10 is executed each time the engine ECU 4 is activated. In step 801, the value of the fuel cap activation flag is read out from the timer IC 41. In step 802, the flag value is judged to determine whether the host microcomputer 46 has been activated as a result of the opening signal being produced from the fuel cap actuation lever 10. If it is found that this is the case, i.e., the fuel cap activation flag value is 1, processing proceeds to step 803, while if the flag value is 0 then (since this indicates that the activation of the engine ECU 4 was caused by switch-on of the IG signal, or by an activation request signal being produced from the OR gate 42 after the predetermined time interval elapsed following switch-off of the IG signal) then this processing is ended and the processing routine of FIG. 2, described hereinabove, is started.

In step 804, control of the fuel vapor adsorption unit 65 is performed to adsorb fuel vapor that is present in the fuel tank. In step 806, based on a sensor output signal from the pressure sensor within the fuel tank, a decision is made as to whether the pressure within the fuel tank is below a predetermined value. If the pressure is not below the predetermined value, then processing returns to step 804, and steps 804 to 806 are repeated, to continue adsorption of fuel vapor by the fuel vapor adsorption unit 65. If the pressure is below the predetermined value, then processing goes to step 807.

In step 807 the fuel intake aperture is opened, and a completion signal is sent to the timer IC 41, which then resets the fuel cap activation flag to 0, and terminates outputting of the activation signal to the OR gate 42. This processing routine is then ended, and (if the host microcomputer 46 remains activated) the processing routine of FIG. 2 is started.

Figure 11:
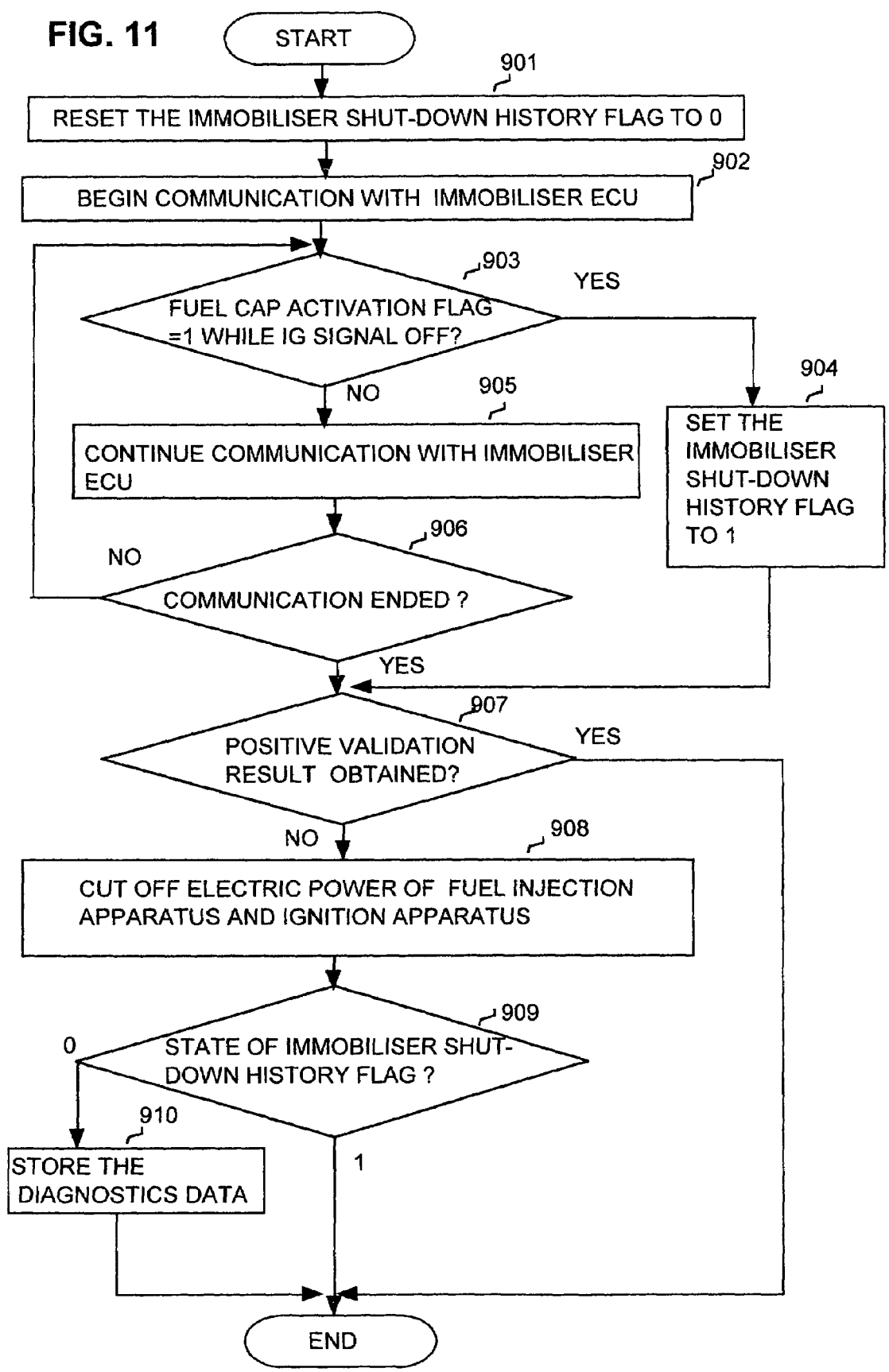
FIG. 11 is a flow diagram of processing that is executed with the third embodiment relating to communication between the engine ECU and an immobilizer ECU.

FIG. 11 shows the contents of the processing step 808 of FIG. 10, i.e., processing relating to communication between the engine ECU 4 and the immobilizer ECU 3 with this embodiment. In place of the step 303 in the flow diagram of FIG. 3 for reading out the value of the timer flag from the timer IC 41 and judging whether the flag value is 1 while the IG signal is not being produced from the key cylinder 1, with this embodiment there is a step 903 of reading out the value of the fuel cap activation flag from the timer IC 41 and judging whether the flag value is 1 while the IG signal is not being produced, i.e., to determine whether communication between the immobilizer ECU 3 and engine ECU 4 was interrupted by switch-off of the IG signal, but an activation request signal was produced due to an opening signal being generated from the fuel cap actuation lever 10, while the communication was still in progress. If that is found to be true, the immobilizer shut-down history flag is set to 1, in step 904.

Other than for the judgement step 903, the processing of the flow diagram of FIG. 11 is identical to that of the flow diagram of FIG. 3, so that detailed description is omitted.

In the same way as described for the preceding embodiments, it would be possible to base the activation and judgement operations of this embodiment upon the open/closed status of a specific key switch signal other than the IG signal, e.g., the key insertion signal or ACC signal.

It can thus be understood that with this embodiment, when the host microcomputer 46 becomes activated, it determines whether this has been caused by an activation signal resulting from the opening signal being produced from the fuel cap actuation lever 10. If that is found to be the case, the host microcomputer 46 begins to control the fuel vapor adsorption unit 65 to perform adsorption of fuel vapor from the fuel tank, and after the pressure in the fuel tank has been reduced to a sufficient degree, the host microcomputer 46 applies control for opening the fuel intake aperture of the vehicle. The emission of fuel vapor to the atmosphere can thereby be prevented, and the user can actuate the fuel cap actuation lever 10 to open the fuel intake aperture while the vehicle engine is halted.

Fourth Embodiment

With a fourth embodiment, the electronic control apparatus includes a fuel cap actuation lever 10 as described for the third embodiment, however the opening signal produced from the fuel cap actuation lever 10 is supplied directly to the OR gate 42 and the host microcomputer 46. This is the essential point of difference between this embodiment and the third embodiment.

Figure 12:
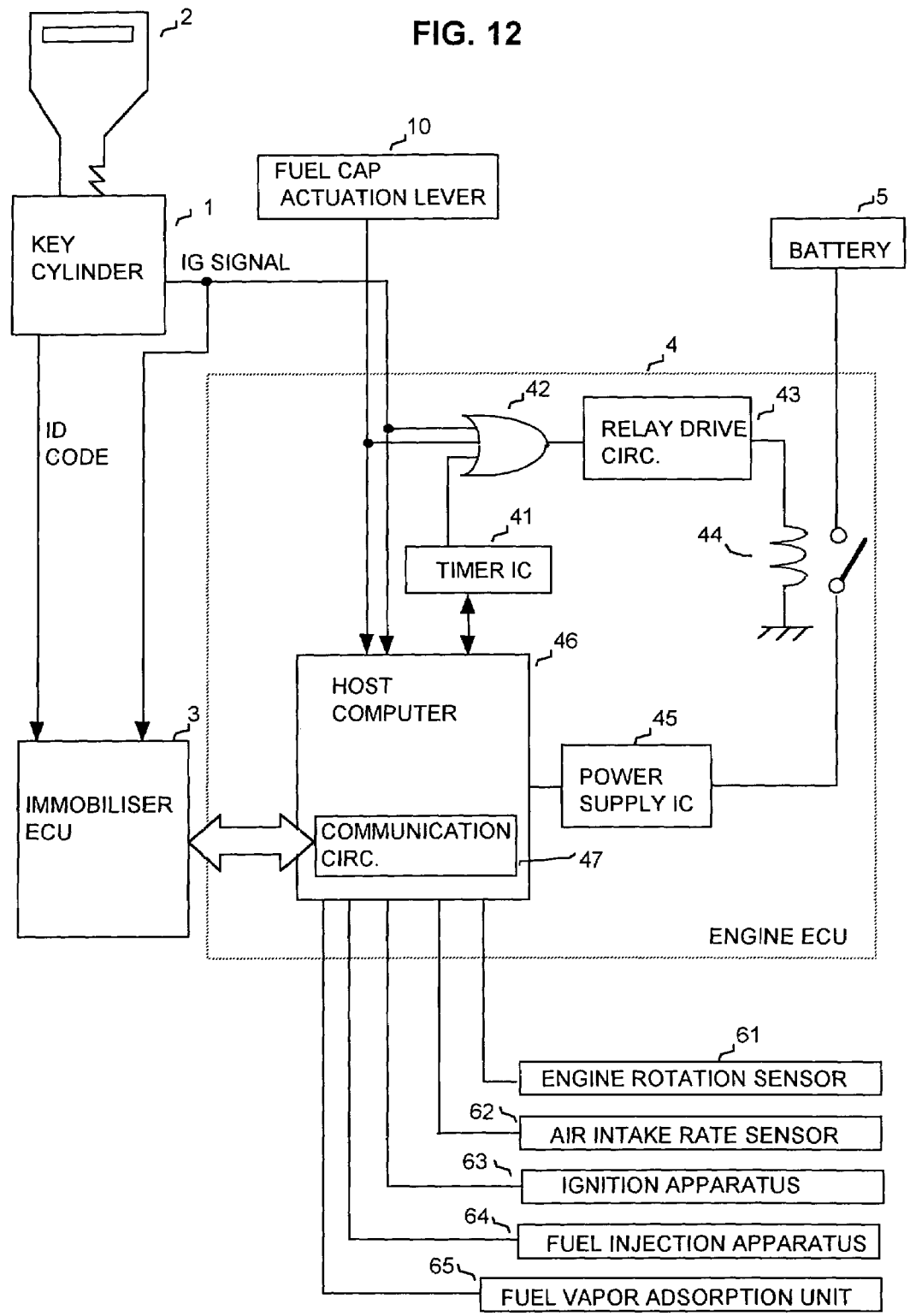
FIG. 12 is a general system block diagram of a fourth embodiment of an electronic control apparatus.

FIG. 12 is a block diagram of the overall configuration of this embodiment. As shown, the fuel cap actuation lever 10 is connected to directly supply the opening signal to the OR gate 42 as an activation request signal, and also to an input of the host microcomputer 46. With this embodiment, the host microcomputer 46 is configured to be capable of detecting when the opening signal is being supplied thereto, in addition to being capable of detecting that the IG signal is being supplied thereto as with the preceding embodiments. In response to the opening signal supplied thereto, the OR gate 42 outputs a corresponding drive signal to the relay drive circuit 43, as an activation signal for activating the host microcomputer 46.

Instead of the fuel cap activation flag being set when the opening signal is produced, and the value of that fuel cap activation flag being judged as in step 802 of FIG. 10 of the third embodiment, the host microcomputer 46 of the fourth embodiment judges whether it has received the opening signal from the fuel cap actuation lever 10, and if so (i.e., with this having the same effect as a "flag value=1" decision in step 802 of FIG. 10), the host microcomputer 46 controls opening of the fuel intake aperture and the operation of the fuel vapor adsorption unit 65 based on the result of that judgement (i.e., performs operations corresponding to the sequence of steps 803 to 807 or 803 to 808 of FIG. 10).

If the fuel cap actuation lever 10 is actuated and the opening signal is thereby outputted and the host microcomputer 46 is thereby activated, after the IG signal has started to be produced so that communication between the communication circuit 47 and the immobilizer ECU 3 is in progress, the host microcomputer 46 terminates the communication between the communication circuit 47 and the immobilizer ECU 3, i.e., sets the immobilizer ECU 3 in the shut-down condition, and sets the immobilizer shut-down history flag to 1.

In other respects, the operation and configuration of this embodiment correspond to those of the third embodiment, so that detailed description is omitted.

Fifth Embodiment

Figure 13:
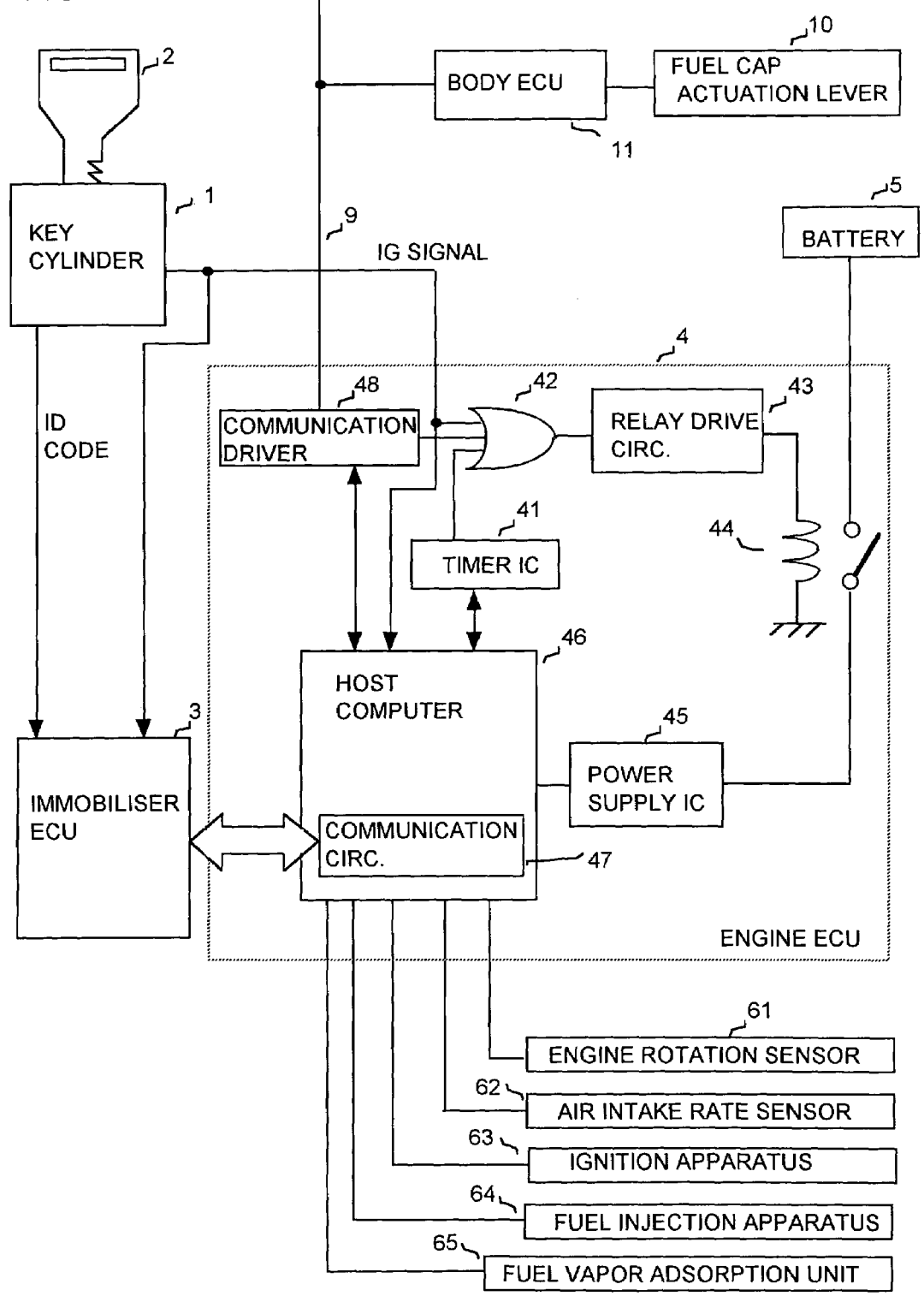
FIG. 13 is a general system block diagram of a fifth embodiment of an electronic control apparatus.

A fifth embodiment will be described which is applicable to a vehicle equipped with a body ECU 11 as well as a vehicle LAN 9, and moreover a fuel cap actuation lever 10 as described for the third embodiment. The overall configuration is shown in the block diagram of FIG. 13. With the fifth embodiment, the engine ECU 4 includes a communication driver 48 that functions as an interface with the vehicle LAN 9. When the fuel cap actuation lever 10 is actuated by the user of the vehicle and the opening signal is thereby produced, that signal is supplied to the body ECU 11, with a corresponding opening signal being thereby transferred from the body ECU 11 via the vehicle LAN 9 to the communication driver 48, and with corresponding signals being thereby supplied from the communication driver 48 to the OR gate 42 and to the host microcomputer 46. This is the main feature of this embodiment.

The communication driver 48 includes a fuel cap activation flag. If the communication driver 48 receives the opening signal from the fuel cap actuation lever 10 via the vehicle LAN 9 while the engine is halted (more specifically, while the IG signal is not being produced), the host microcomputer 46 notifies the communication driver 48 of the engine halt status, and the communication driver 48 thereby sets the fuel cap activation flag to 1, and outputs an activation request signal to the OR gate 42. A drive signal (i.e., activation signal) is thereby supplied from the OR gate 42 to the relay drive circuit 43 to activate the host microcomputer 46. When the host microcomputer 46 subsequently supplies a completion signal to the communication driver 48 (after the pressure within the fuel tank has been reduced below the predetermined value and the fuel intake aperture then opened) the communication driver 48 resets the fuel cap activation flag to 0. While the fuel cap activation flag value is 1, the host microcomputer 46 controls the operation of the fuel vapor adsorption unit 65 for lowering the pressure within the fuel tank, and subsequent opening of the fuel intake aperture.

If an activation signal is outputted from the communication driver 48 after the IG signal has been produced and communication between the communication circuit 47 and the immobilizer ECU 3 is in progress, the communication is interrupted before it has been completed (i.e., the immobilizer ECU 3 is shut down). When that occurs, the host microcomputer 46 sets the immobilizer shut-down history flag to 1.

In other respects, the configuration and operation of the fifth embodiment are identical to those of the third embodiment, so that detailed description is omitted.

It can thus be understood that with the fifth embodiment, in which the opening signal that is produced from the fuel cap actuation lever 10 is inputted to the body ECU 11 to be transmitted through the vehicle LAN 9 to the engine ECU 4, the pressure within the fuel tank is appropriately reduced before the fuel intake aperture is opened, so that emission of fuel vapor to the atmosphere can be prevented, and the user can actuate the fuel cap actuation lever 10 to open the fuel intake aperture while the vehicle engine is halted.

With the first embodiment described above, there are two possible causes of activation of the engine ECU 4, i.e., due to the IG signal being switched on or due to an activation request signal being produced from the timer IC 41, while with each of the second through fifth embodiments there are three possible causes of activation of the engine ECU 4. However the invention is not limited to such a number. If each of a plurality of sources of activation request signals (i.e., requesting respectively different operations that are to be performed while the engine is halted) are assigned respectively corresponding flags in the engine ECU 4 (each of which is set when a request signal is supplied from the corresponding source, with an activation request then being produced as described for the preceding embodiments) then each time that the engine ECU 4 becomes activate, the respective states of these flags are successively judged. If any flag is found to be in the set condition, then the corresponding control operation is performed by the engine ECU 4.

Figure 14:
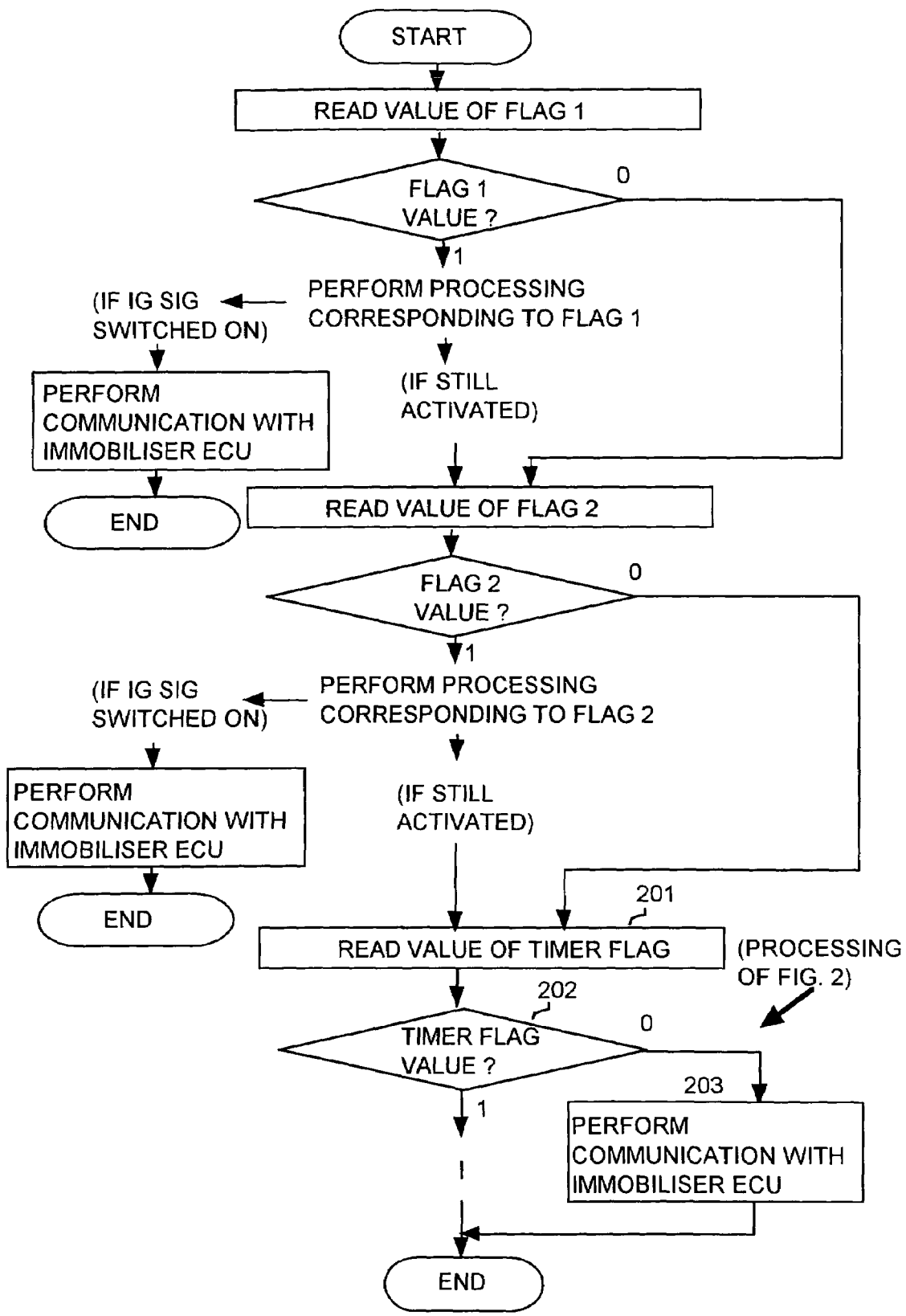
FIG. 14 is a conceptual system block diagram for illustrating the use of a plurality of flags corresponding to respective external sources of activation request signals.

This is conceptually illustrated in the flow diagram of FIG. 14, in which two different sources of activation request signals (external to the engine ECU 4) are assigned respectively corresponding flags, provided in the engine ECU 4, that are designated flag 1 and flag 2. When a request signal is received from the source corresponding to one of these flags, the flag is set to 1 and an activation request signal is generated to activate the engine ECU 4 (i.e., with a configuration as for the above embodiments, the activation request signal is inputted to the OR gate 42). In the example of FIG. 14, when activation of the engine ECU 4 occurs, the value of flag 1 is first examined. If that flag is set to 1, then the processing that is predetermined as corresponding to flag 1 is then executed. If the engine ECU 4 remains activated upon completion of that processing, with the IG signal remaining off (i.e., due to an activation request corresponding to another flag having been received during the processing corresponding to flag 1) or if the value of flag 1 is 0, then flag 2 is examined, and the above procedure is repeated. That is, if the flag 2 value is 0 or if the engine ECU 4 remains activated upon completion of the processing corresponding to flag 2, the processing of FIG. 2 is then started.

With the first embodiment described above, after a predetermined time interval has elapsed following halting of the vehicle engine, the engine ECU 4 is activated by the timer IC 41, and performs an evaporative leak check. With each of the second to fifth embodiments, the engine ECU 4 can also be activated by a signal produced from an apparatus that is external to the engine ECU 4, such as the navigation apparatus 8 or the fuel cap actuation lever 10, while the specific key switch signal (e.g., IG signal) is not being produced, with the engine ECU 4 thereby performing an action such as transmitting diagnostics history data or controlling the operation of the fuel vapor adsorption unit 65, etc. However it should be noted that the invention is not limited to these embodiments, and that for example as a sixth embodiment, the engine ECU 4 could be activated based on a door sensor signal that is produced when a door lock of the vehicle is opened or released, or a seat sensor signal that is produced when a person sits in the driver seat of the vehicle. In either case, the sensor signal could be transmitted directly to the engine ECU 4 or transferred via a body ECU, as for the fifth embodiment.

Alternatively, the apparatus could be configured such that after the vehicle engine has been halted (e.g., after the IG signal has been switched off) the engine ECU 4 is activated to perform initialization processing, or activate a catalyst of an exhaust emission control system of the vehicle, or perform processing to set initial positions of the intake and exhaust valves of the engine, etc. In that way, each time that the engine is halted, various types of preparatory processing can be performed for activating equipment of the vehicle, such that when the ignition key 2 is next actuated to start the vehicle engine, this can be smoothly achieved. While such preparatory processing is being executed with the engine halted, only the engine ECU 4 is activated, without power being supplied to operate the immobilizer ECU 3, so that communication between the engine ECU 4 and the immobilizer ECU 3 is inhibited. Such communication is only initiated when the user actuates the ignition key 2 to produce the predetermined one of the key switch signals, such as the IG signal, as described for the above embodiments.

It can be understood from the above that the invention is not limited to being based on judging whether the IG signal is produced, and that it would be equally possible for example to configure the apparatus such that after the engine has been halted, the immobilizer ECU 3 and the engine ECU 4 are each activated (and communication between them initiated) in response to the ACC signal being produced when the ACC switch is closed, or in response to the key insertion signal being produced when the ignition key 2 is inserted into the key cylinder 1.

Furthermore with each of the above embodiments, the engine ECU 4 communicates with the immobilizer ECU 3 and must receive a positive validation result from the immobilizer ECU 3 before starting of the vehicle engine (i.e., internal combustion engine) is enabled. However the invention would be equally applicable to an electrically driven vehicle having, in place of the engine ECU 4, a hybrid ECU controlling a motor that drives the vehicle. If the vehicle is equipped with a user validation apparatus such as an immobilizer which can enable or inhibit driving of the vehicle, then it will be apparent that the present invention could be applied in a similar manner to that described for the case of an internal combustion engine.

Moreover in each of the above embodiments an electronic control apparatus is described as including an internal device (i.e., timer IC 41) for producing an activation request to activate a section of the apparatus (i.e., the host microcomputer 46) that performs the actual judgement functions and control functions of the electronic control apparatus. However the invention would be equally applicable to an electronic control apparatus which does not have such an internal activation function, i.e., is activated only by either a specific key switch signal such as the IG signal or by an externally generated activation request signal.

The above embodiments can be utilized individually, to achieve the respective effects described for these. However it should be noted that greater advantages could be obtained by combining the respective features of two or more of these embodiments. In that way, for example, an engine ECU configured as such an electronic control apparatus could be provided with a plurality of flags, for indicating that respective requests have been received from various items of equipment of the vehicle, such as a remote diagnosis activation flag, a fuel cap activation flag, etc. When it is confirmed that any of these flags has been set, then a corresponding control operation could be performed by the engine ECU.

As can be understood from the above description of embodiments, it is a particular feature of the invention that a reliable distinction is made between a case in which an electronic control apparatus such as an engine ECU of a vehicle is activated as a result of an action by a user that may indicate an intention to start the vehicle engine, and a case in which the electronic control apparatus is activated (while the engine is halted) to perform a control operation, e.g., for executing an evaporative leak check, transmitting failure diagnosis information, lowering the pressure within the fuel tank, etc. As a result, it can be ensured that when a condition occurs whereby the electronic control apparatus is activated while the user validation apparatus is deactivated, with the user validation apparatus having been deactivated as a result of the predetermined key switch (e.g., ignition switch) being opened while communication between the user validation apparatus and electronic control apparatus was in progress, with a communication interruption having thereby occurred, and with the electronic control apparatus continuing in the activated condition as a result of an activation request having been received while the communication was in progress, the communication interruption occurrence will not be incorrectly detected and recorded as being a communication error. Hence, reliable operation can be achieved and erroneous detection and recording of failure data can be avoided.

The invention is not limited in application to an electronic control apparatus that is an engine ECU of a vehicle, but could be applied to any other electronic control apparatus of a vehicle that is equipped with a user validation apparatus, with similar results being obtainable. Essentially, such an electronic control apparatus:

(a) is activated to perform a first control operation (or set of control operations) when a specific command signal (e.g., key switch signal, such as the IG signal) is produced, a validation operation is then performed, and a positive validation result obtained thereby, and (b) is activated to perform a second control operation (or set of control operations) until completion, without communicating with the user validation apparatus, when an activation request signal is received from a source that is predetermined as corresponding to the second control operation, while the specific command signal is not being generated.

It should further be noted that the type of user validation apparatus is not limited to that of the described embodiments, but could be any type of validation apparatus that can be controllably activated and deactivated, irrespective of whether validation is based on acquiring a code stored in an IC chip that is built into in a key or an IC card, a code printed as a magnetic pattern on a card, etc.

It should thus be understood that the scope of the invention is not limited to the embodiments described above, and that various modifications or alternative forms of these embodiments could be envisaged which fall within the scope claimed for the invention, as set out in the appended claims.

What is claimed is:

1. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, and said electronic control apparatus and said user validation apparatus comprising respective separately installed apparatus units in said vehicle;

wherein said electronic control apparatus comprises:

activation purpose judgement means responsive to activation of said electronic control apparatus for judging whether or not said activation results from said specific key switch becoming closed for the purpose of starting of an internal combustion engine of said vehicle, with said judgment being based upon detecting whether or not said user validation apparatus is currently activated, and control means responsive to a decision of said activation purpose judgement means that said activation of said electronic control apparatus has a purpose other than starting said engine for beginning a second predetermined control operation, without communicating with said user validation apparatus.

2. An electronic control apparatus according to claim 1, said acquired activation request being produced from a corresponding one of a plurality of sources of activation requests, wherein:

said activation purpose judgement means determines said corresponding source of said acquired activation request, and said control means performs, as said second control operation, a control operation predetermined as corresponding to said corresponding source of said acquired activation request.

3. An electronic control apparatus according to claim 1, comprising a flag that is set when said activation request is acquired by said electronic control apparatus, wherein said activation purpose judgement means detects a condition of said flag, and when said flag is found to be set, judges that that said activation of said electronic control apparatus has not resulted from said specific key switch being closed.

4. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open,
wherein said electronic control apparatus comprises:
activation purpose judgement means responsive to activation of said electronic control apparatus for judging whether or not said activation results from said specific key switch becoming closed for the purpose of starting of an internal combustion engine of said vehicle,
control means responsive to a decision of said activation purpose judgement means that said activation of said electronic control apparatus has a purpose other than starting said engine for beginning a second predetermined control operation, without communicating with said user validation apparatus, and
memory means for storing, as diagnostics history data, information indicative of a failure to obtain a positive validation result through communication with said user validation apparatus;
wherein when said failure has occurred, said electronic control apparatus has become activated as a result of having received said activation request, and said user validation apparatus has become deactivated, said activation purpose judgement means judges a cause of said deactivated condition of said user validation apparatus, and inhibits storing of said information indicative of said failure when it is judged that said user validation apparatus has become deactivated as a result of said predetermined key switch becoming open while said communication between said electronic control apparatus and said user validation apparatus is in progress.

5. An electronic control apparatus according to claim 1, wherein said user validation apparatus is rendered activated by supplying electric power thereto and is rendered deactivated by interrupting said supply of electric power thereto.

6. An electronic control apparatus according to claim 1, wherein said electronic control apparatus is rendered activated by supplying electric power thereto and is rendered deactivated by interrupting said supply of electric power thereto.

7. An electronic control apparatus according to claim 1, wherein when said specific key switch becomes closed after said electronic control apparatus has received said activation request while said predetermined key switch is open, said control means initiates communication between said electronic control apparatus and said user validation apparatus to obtain said validation result, and begins said first predetermined control operation when said validation result is found to be positive.

8. An electronic control apparatus according to claim 1, said vehicle being powered by an internal combustion engine and said first predetermined control operation comprising control of operating functions of at least one of an ignition apparatus and a fuel delivery apparatus of said internal combustion engine;
wherein when said electronic control apparatus is activated while said predetermined key switch is open, said electronic control apparatus inhibits the functioning of at least one of said ignition apparatus and said fuel delivery apparatus, and begins a diagnosis operation relating to said internal combustion engine as said second predetermined control operation.

9. An electronic control apparatus according to claim 8, wherein said inhibiting of operation is performed by interrupting a supply of electric power to at least one of said ignition apparatus and said fuel delivery apparatus.

10. An electronic control apparatus according to claim 1, said vehicle comprising a communication apparatus adapted for wireless communication with a supervisory center that is external to said vehicle and for communication with said electronic control apparatus, and said electronic control apparatus performing diagnosis of a condition of predetermined equipment of said vehicle and recording diagnostics data obtained thereby;
wherein a request signal transmitted from said supervisory center is acquired by said electronic control apparatus from said communication apparatus as said activation request, with said activation request being recognized as originating from said supervisory center, and wherein said electronic control apparatus is thereby activated to transfer said diagnostics data to said communication apparatus, to be transmitted to said supervisory center.

11. An electronic control apparatus according to claim 1, said vehicle comprising a fuel tank provided with a fuel intake aperture, and means operable for producing an opening command signal to designate that said fuel intake aperture is to be opened;
wherein said opening command signal is supplied to said electronic control apparatus as said activation request, and said electronic control apparatus performs, as said second predetermined control operation, an operation for lowering pressure within said fuel tank to a predetermined value and for thereafter opening said fuel intake aperture.

12. An electronic control apparatus according to claim 1, said vehicle comprising at least one of a group of sensors including a door sensor for detecting opening of a door of said vehicle and a seat sensor for detecting that a person is occupying a driver seat of said vehicle;
wherein a sensor signal produced from at least one of said sensors is supplied to said electronic control apparatus as said activation request, whereby said electronic control apparatus performs, as said second predetermined control operation, at least one of a group of control operations including initialization processing preparatory to starting an internal combustion engine of said vehicle, activation processing of a catalyst of an exhaust emission control system of said vehicle, and initial position setting of exhaust valves and intake valves of an internal combustion engine of said vehicle.

13. An electronic control apparatus according to claim 3 wherein a plurality of said flags have respective predetermined correspondences with a plurality of control operations and have respective predetermined correspondences with a plurality of sources of activation requests, and wherein when said electronic control apparatus acquires said activation request, a one of said flags that corresponds to said source of said acquired activation request is set, and wherein upon said electronic control apparatus becoming activated, said activation purpose judgement means successively judges respective states of said flags and when at least one of said flags is found to have been set, said control means begins a control operation predetermined as corresponding to said flag that has been set, as said second predetermined control operation.

14. An electronic control apparatus according to claim 1, said vehicle comprising general-purpose in-vehicle communication means that enable communication between said electronic control apparatus and the exterior thereof;
wherein an externally generated request signal that is transferred to said electronic control apparatus via said general-purpose in-vehicle communication means is acquired by said electronic control apparatus as an activation request.

15. An electronic control apparatus according to claim 1, wherein closing of said specific key switch corresponds to a predetermined one of a group of operations which includes insertion of an ignition key into a key cylinder that is provided with an insertion switch, thereby producing a key insertion signal, closing of an accessory switch, thereby producing an accessory signal, and closing of an ignition switch, thereby producing an ignition signal.

16. An electronic control apparatus mounted in a vehicle, for controlling equipment of said vehicle, said vehicle incorporating an internal combustion engine and comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open,
wherein said electronic control apparatus comprises:
activation purpose judgement circuitry responsive to activation of said electronic control apparatus for judging whether or not said activation results from said specific key switch becoming closed for the purpose of starting said engine, with said judgment being based upon detecting whether or not said user validation apparatus is currently activated;
control circuitry responsive to a decision of said activation purpose judgement circuitry that said activation of said electronic control apparatus has a purpose other than starting said engine for beginning a second predetermined control operation, without communicating with said user validation apparatus, and for deactivating the engine control apparatus upon completion of the second predetermined control operation;
said first predetermined control operation comprising control of equipment that is essential for running said engine; and
when said electronic control apparatus is activated while said predetermined key switch is open, said electronic control apparatus inhibits the functioning of at least a part of said equipment that is essential for running said engine;
wherein said electronic control apparatus and said user validation apparatus comprise respective separately installed apparatus units in said vehicle.

17. An electronic control apparatus according to claim 16, wherein said equipment that is essential for running said engine includes least one of an ignition apparatus and a fuel delivery apparatus.

18. An electronic control apparatus according to claim 16, wherein when said electronic control apparatus is activated while said predetermined key switch is open, said electronic control apparatus begins a diagnosis operation relating to said engine as said second predetermined control operation.

19. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open,
wherein said electronic control apparatus comprises:
activation purpose judgement circuitry responsive to activation of said electronic control apparatus for judging whether or not said activation results from said specific key switch becoming closed for the purpose of starting of an internal combustion engine of said vehicle, with said judgment being based upon detecting whether or not said user validation apparatus is currently activated; and
control circuitry responsive to a decision of said activation purpose judgement circuitry that said activation of said electronic control apparatus has a purpose other than starting said engine for beginning a second predetermined control operation, without communicating with said user validation apparatus, and for deactivating the engine control apparatus upon completion of the second predetermined control operation;
wherein said electronic control apparatus and said user validation apparatus comprise respective separately installed apparatus units in said vehicle.

20. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, wherein said electronic control apparatus comprises:

activation purpose judgement circuitry responsive to activation of said electronic control apparatus for judging whether or not said activation results from said specific key switch becoming closed for the purpose of starting of an internal combustion engine of said vehicle, control circuitry responsive to a decision of said activation purpose judgement circuitry that said activation of said electronic control apparatus has a purpose other than starting said engine for beginning a second predetermined control operation, without communicating with said user validation apparatus, and a memory for storing, as diagnostics history data, information indicative of a failure to obtain a positive validation result through communication with said user validation apparatus;

wherein when said failure has occurred, said electronic control apparatus has become activated as a result of having received said activation request, and said user validation apparatus has become deactivated, said activation purpose judgement circuitry judges a cause of said deactivated condition of said user validation apparatus, and inhibits storing of said information indicative of said failure when it is judged that said user validation apparatus has become deactivated as a result of said predetermined key switch becoming open while said communication between said electronic control apparatus and said user validation apparatus is in progress.

21. An electronic control apparatus according to claim 20, wherein the activation purpose judgement circuitry determines that the electronic control apparatus has become activated as a result of having received the activation request by detecting a condition of a flag that is set when the activation request is received by the electronic control apparatus.

22. A method of controlling equipment of a vehicle, the method comprising:

activating a user validation apparatus to perform a user validation operation when a specific key switch of said vehicle becomes closed and deactivating the user validation apparatus when said specific key switch becomes open;

selectively activating and deactivating an electronic control unit in accordance with said specific key switch becoming respectively closed and opened;

performing communication between the electronic control unit and the user validation apparatus when the electronic control unit is activated in accordance with the specific key switch for obtaining a validation result derived from said validation operation and beginning a first predetermined control operation when said validation result is positive;

activating the electronic control unit upon acquiring an activation request from a source that is internal or external thereto, while said specific key switch is open;

judging whether or not said activation results from said specific key switch becoming closed for the purpose of starting of an internal combustion engine of said vehicle, with said judgment being based upon detecting whether or not said user validation apparatus is currently activated; and responsive to a judgement that the activation of said electronic control apparatus has a purpose other than starting said engine, beginning a second predetermined control operation, without the electronic control unit communicating with said user validation apparatus, and deactivating the engine control apparatus upon completion of the second predetermined control operation;

wherein said electronic control apparatus and said user validation apparatus comprise respective separately installed apparatus units in said vehicle.

23. A method of controlling equipment of a vehicle, the method comprising:

activating a user validation apparatus to perform a user validation operation when a specific key switch of said vehicle becomes closed and deactivating the user validation apparatus when said specific key switch becomes open;

selectively activating and deactivating an electronic control unit in accordance with said specific key switch becoming respectively closed and opened;

performing communication between the electronic control unit and the user validation apparatus when the electronic control unit is activated in accordance with the specific key switch for obtaining a validation result derived from said validation operation and beginning a first predetermined control operation when said validation result is positive;

activating the electronic control unit upon acquiring an activation request from a source that is internal or external thereto, while said specific key switch is open;

judging whether or not said activation results from said specific key switch becoming closed for the purpose of starting of an internal combustion engine of said vehicle;

responsive to a judgement that the activation of said electronic control apparatus has a purpose other than starting said engine, beginning a second predetermined control operation, without the electronic control unit communicating with said user validation apparatus; and storing diagnostics information indicative of a failure to obtain a positive validation result through communication between the electronic control apparatus and the user validation apparatus; and inhibiting storing of said diagnostics information indicative of said failure when it is judged that said user validation apparatus has become deactivated as a result of said predetermined key switch becoming open while said communication between said electronic control apparatus and said user validation apparatus is in progress and as a result of electronic control apparatus having been activated as a result of having received the activation request.

24. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, wherein said electronic control apparatus comprises:

activation purpose judgement means responsive to activation of said electronic control apparatus for judging a purpose of said activation, with said judgment being based upon detecting whether or not said user validation apparatus is currently activated; and control means responsive to a decision of said activation purpose judgement means that said purpose of the activation of said electronic control apparatus is to perform an equipment diagnosis operation for performing said equipment diagnosis operation and for deactivating said engine control apparatus upon completion of said equipment diagnosis operation; and wherein said electronic control apparatus and said user validation apparatus comprise respective separately installed apparatus units in said vehicle.

25. An electronic control apparatus according to claim 24, said acquired activation request being produced from a corresponding one of a plurality of sources of activation requests, wherein:

said activation purpose judgement means determines said corresponding source of said acquired activation request, and said control means performs said equipment diagnosis operation as a control operation predetermined as corresponding to said corresponding source of said acquired activation request.

26. An electronic control apparatus according to claim 24, comprising a flag that is set when said activation request is acquired by said electronic control apparatus, wherein said activation purpose judgement means detects a condition of said flag, and when said flag is found to be set, judges that that said activation of said electronic control apparatus has not resulted from said specific key switch being closed.

27. An electronic control apparatus according to claim 24, wherein said user validation apparatus is rendered activated by supplying electric power thereto and is rendered deactivated by interrupting said supply of electric power thereto.

28. An electronic control apparatus according to claim 24, wherein said electronic control apparatus is rendered activated by supplying electric power thereto and is rendered deactivated by interrupting said supply of electric power thereto.

29. An electronic control apparatus according to claim 24, wherein when said specific key switch becomes closed after said electronic control apparatus has received said activation request while said predetermined key switch is open, said control means initiates communication between said electronic control apparatus and said user validation apparatus to obtain said validation result, and begins said first predetermined control operation when said validation result is found to be positive.

30. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, wherein said electronic control apparatus comprises:

activation purpose judgement means responsive to activation of said electronic control apparatus for judging a purpose of said activation, with said judgment being based upon detecting whether or not said user validation apparatus is currently activated, and control means responsive to a decision of said activation purpose judgement means that said purpose of the activation of said electronic control apparatus is to perform a specific operation after a specific timed duration has elapsed following halting of said engine for performing said specific operation and for deactivating said engine control apparatus upon completion of said specific operation; and wherein said electronic control apparatus and said user validation apparatus comprise respective separately installed apparatus units in said vehicle.

31. An electronic control apparatus according to claim 30, said acquired activation request being produced from a corresponding one of a plurality of sources of activation requests, wherein:

said activation purpose judgement means determines said corresponding source of said acquired activation request, and said control means performs said specific operation as a control operation predetermined as corresponding to said corresponding source of said acquired activation request.

32. An electronic control apparatus according to claim 30, comprising a flag that is set when said activation request is acquired by said electronic control apparatus, wherein said activation purpose judgement means detects a condition of said flag, and when said flag is found to be set, judges that that said activation of said electronic control apparatus has not resulted from said specific key switch being closed.

33. An electronic control apparatus according to claim 30, wherein said user validation apparatus is rendered activated by supplying electric power thereto and is rendered deactivated by interrupting said supply of electric power thereto.

34. An electronic control apparatus according to claim 30, wherein said electronic control apparatus is rendered activated by supplying electric power thereto and is rendered deactivated by interrupting said supply of electric power thereto.

35. An electronic control apparatus according to claim 30, wherein when said specific key switch becomes closed after said electronic control apparatus has received said activation request while said predetermined key switch is open, said control means initiates communication between said electronic control apparatus and said user validation apparatus to obtain said validation result, and begins said first predetermined control operation when said validation result is found to be positive.

36. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, wherein said electronic control apparatus comprises:

activation purpose judgement means responsive to activation of said electronic control apparatus for judging a purpose of said activation, with said judgment beining based upon detecting whether or not said user validation apparatus is currently activated, and control means responsive to a decision of said activation purpose judgement means that said purpose of the activation of said electronic control apparatus is to perform a data transmission operation, in response to a request received from a supervisory center, for performing said data transmission operation and for deactivating said engine control apparatus upon completion of performing said data transmission operation; and wherein said electronic control apparatus and said user validation apparatus comprise respective separately installed apparatus units in said vehicle.

37. An electronic control apparatus according to claim 36, said acquired activation request being produced from a corresponding one of a plurality of sources of activation requests, wherein:

said activation purpose judgement means determines said corresponding source of said acquired activation request, and said control means performs said data transmission operation as a control operation predetermined as corresponding to said corresponding source of said acquired activation request.

38. An electronic control apparatus according to claim 36, comprising a flag that is set when said activation request is acquired by said electronic control apparatus, wherein said activation purpose judgement means detects a condition of said flag, and when said flag is found to be set, judges that that said activation of said electronic control apparatus has not resulted from said specific key switch being closed.

39. An electronic control apparatus according to claim 36, wherein said user validation apparatus is rendered activated by supplying electric power thereto and is rendered deactivated by interrupting said supply of electric power thereto.

40. An electronic control apparatus according to claim 36, wherein said electronic control apparatus is rendered activated by supplying electric power thereto and is rendered deactivated by interrupting said supply of electric power thereto.

41. An electronic control apparatus according to claim 36, wherein when said specific key switch becomes closed after said electronic control apparatus has received said activation request while said predetermined key switch is open, said control means initiates communication between said electronic control apparatus and said user validation apparatus to obtain said validation result, and begins said first predetermined control operation when said validation result is found to be positive.

42. An electronic control apparatus mounted in a vehicle for controlling equipment of said vehicle, said vehicle comprising a user validation apparatus adapted to become activated to perform a user validation operation when a specific key switch of said vehicle becomes closed and to become deactivated when said specific key switch becomes open, said electronic control apparatus adapted to become selectively activated and deactivated in accordance with said specific key switch becoming respectively closed and open, and upon becoming activated, to perform communication with said user validation apparatus for obtaining a validation result derived from said validation operation and to begin a first predetermined control operation when said validation result is positive, said electronic control apparatus being further adapted to become activated upon acquiring an activation request from a source that is internal or external thereto, while said specific key switch is open, wherein said electronic control apparatus comprises:

activation purpose judgement means responsive to activation of said electronic control apparatus for judging a purpose of said activation, with said judgment being based upon detecting whether or not said user validation apparatus is currently activated, and control means responsive to a decision of said activation purpose judgement means that said purpose of the activation of said electronic control apparatus is to perform a control sequence, to lower pressure within said fuel tank to a predetermined value and thereafter open said fuel intake aperture, for performing said control sequence and for deactivating said engine control apparatus upon completion of said control sequence; and wherein said electronic control apparatus and said user validation apparatus comprise respective separately installed apparatus units in said vehicle.

43. An electronic control apparatus according to claim 42, said acquired activation request being produced from a corresponding one of a plurality of sources of activation requests, wherein:

said activation purpose judgement means determines said corresponding source of said acquired activation request, and said control means performs said control sequence as a control operation predetermined as corresponding to said corresponding source of said acquired activation request.

44. An electronic control apparatus according to claim 42, comprising a flag that is set when said activation request is acquired by said electronic control apparatus, wherein said activation purpose judgement means detects a condition of said flag, and when said flag is found to be set, judges that that said activation of said electronic control apparatus has not resulted from said specific key switch being closed.

45. An electronic control apparatus according to claim 42, wherein said user validation apparatus is rendered activated by supplying electric power thereto and is rendered deactivated by interrupting said supply of electric power thereto.

46. An electronic control apparatus according to claim 42, wherein said electronic control apparatus is rendered activated by supplying electric power thereto and is rendered deactivated by interrupting said supply of electric power thereto.

47. An electronic control apparatus according to claim 42, wherein when said specific key switch becomes closed after said electronic control apparatus has received said activation request while said predetermined key switch is open, said control means initiates communication between said electronic control apparatus and said user validation apparatus to obtain said validation result, and begins said first predetermined control operation when said validation result is found to be positive.

\* \* \* \* \*